US012664727B2

(12) United States Patent　　　　　(10) Patent No.:　US 12,664,727 B2
Wu et al.　　　　　　　　　　　　　　(45) Date of Patent:　　Jun. 23, 2026

(54) METHOD OF MODELING INTERACTIVE INTELLIGENT THREE-DIMENSIONAL IMPLICIT STRUCTURE BASED ON DEEP LEARNING

(71) Applicant: University Of Science And Technology Of China, Hefei (CN)

(72) Inventors: Xinming Wu, Hefei (CN); Zhengfa Bi, Hefei (CN)

(73) Assignee: University Of Science And Technology Of China, Hefei (CN)

( * ) Notice: Subject to any disclaimer, the term of this patent is extended or adjusted under 35 U.S.C. 154(b) by 339 days.

(21) Appl. No.: 18/546,360

(22) PCT Filed: Oct. 14, 2022

(86) PCT No.: PCT/CN2022/125275
§ 371 (c)(1),
(2) Date: Aug. 14, 2023

(87) PCT Pub. No.: WO2024/045285
PCT Pub. Date: Mar. 7, 2024

(65) Prior Publication Data
US 2025/0029330 A1　　　Jan. 23, 2025

(30) Foreign Application Priority Data

Aug. 31, 2022　(CN) ......................... 202211064255.5
Oct. 11, 2022　(CN) ......................... 202211240817.7

(51) Int. Cl.
*G06T 17/05* 　　　(2011.01)
*G06N 3/08* 　　　(2023.01)

(52) U.S. Cl.
CPC .............. *G06T 17/05* (2013.01); *G06N 3/08* (2013.01)

(58) Field of Classification Search
CPC .......... G06T 17/05; G06N 3/08; G06N 3/045; G06F 30/27
(Continued)

(56) References Cited

U.S. PATENT DOCUMENTS 11,500,118 B2 * 11/2022 Da Silva Ferreira ....................... G06V 10/772
11,599,790 B2 * 3/2023 Pandey .................... G06N 3/08
(Continued)

FOREIGN PATENT DOCUMENTS

CN　　110441820 A　　11/2019
CN　　110441820 B　* 6/2020　............. G06N 3/045
(Continued)

OTHER PUBLICATIONS

"International Application Serial No. PCT/CN2022/125275, International Search Report dated Jan. 19, 2023", (Jan. 19, 2023), 5 pgs.
(Continued)

*Primary Examiner* — Sheree N Brown

(74) *Attorney, Agent, or Firm* — Schwegman Lundberg & Woessner, P.A.

(57)　　　　　ABSTRACT

A method of modeling interactive intelligent three-dimensional implicit structure based on deep learning is provided, including: generating a plurality of geological simulation structural models by using a data simulation technology, to construct a geological simulation structural model library, where the geological simulation structural model has a diversified fold and a fault feature; acquiring, for each model, geological fault data and unevenly distributed geological horizon data to obtain a training sample data set; training a neural network by using the training sample data set; inputting multi-source heterogeneous data of a target region into a trained neural network, so as to output a geological structural model corresponding to the multi-
(Continued)

S110
Multi-source heterogeneous data of a target region is acquired, where the multi-source heterogeneous data includes fault interpretation data and horizon interpretation data, and the multi-source heterogeneous data includes at least one selected from: geological outcrop observation data, well logging data, various geophysical data or empirical knowledge data S120
The fault interpretation data and the horizon interpretation data are converted based on a preset model grid to obtain converted fault interpretation data and converted horizon interpretation data S130
The converted fault interpretation data and the converted horizon interpretation data are input into a pre-trained neural network, so as to output a full geological structure model corresponding to the target region source heterogeneous data, where the multi-source heterogeneous data includes fault interpretation data and horizon interpretation data, and the multi-source heterogeneous data includes at least one selected from: geological outcrop observation data, well logging data, various geophysical data or empirical knowledge data.

13 Claims, 9 Drawing Sheets

(58) Field of Classification Search
USPC ......................................................... 345/419
See application file for complete search history.

(56)                    References Cited

U.S. PATENT DOCUMENTS

| | | | | |
|---|---|---|---|---|
| 2020/0183047 A1* | 6/2020 | Denli | ..................... | G06N 3/094 |
| 2022/0215620 A1* | 7/2022 | Lieb | ......................... | G06N 3/08 |
| 2023/0136860 A1* | 5/2023 | Wang | ................... | B60W 30/09 |
| | | | | 345/419 |
| 2024/0127039 A1* | 4/2024 | Sheoran | ............ | G06F 18/23213 |

FOREIGN PATENT DOCUMENTS

| | | | | | |
|---|---|---|---|---|---|
| CN | 112562075 A | * | 3/2021 | ............ | G06T 17/05 |
| CN | 114758085 A | * | 7/2022 | ............ | G06N 3/084 |
| CN | 114882187 A | | 8/2022 | | |
| CN | 115421181 A | * | 12/2022 | ............ | G01V 1/282 |
| CN | 112562075 B | * | 8/2024 | ............ | G06T 17/05 |
| CN | 114022631 B | * | 10/2024 | ............ | G06N 3/045 |
| WO | WO-2018184654 A1 | * | 10/2018 | ............ | G06N 3/045 |
| WO | WO-2022078514 A1 | * | 4/2022 | ............ | G01V 1/282 |

OTHER PUBLICATIONS

"International Application Serial No. PCT/CN2022/125275, Written Opinion dated Jan. 19, 2023", (Jan. 19, 2023), 5 pgs.

Bi, Zhengfa, et al., "DeepISMNet: three-dimensional implicit structural modeling with convolutional neural network", Geoscientific Model Development 15.17, (2022), 6841-6861.

"Chinese Application No. 202211240817.7, Office Action dated Nov. 18, 2025", w English Translation, Nov. 18, 2025, 25 pgs.

Bi, Zhengfa, "DeepISMNet Three-dimensional implicit structural modeling with convolutional neural network", Geoscientific Model Development Discussions 2022, 2022, 6841-6861.

* cited by examiner

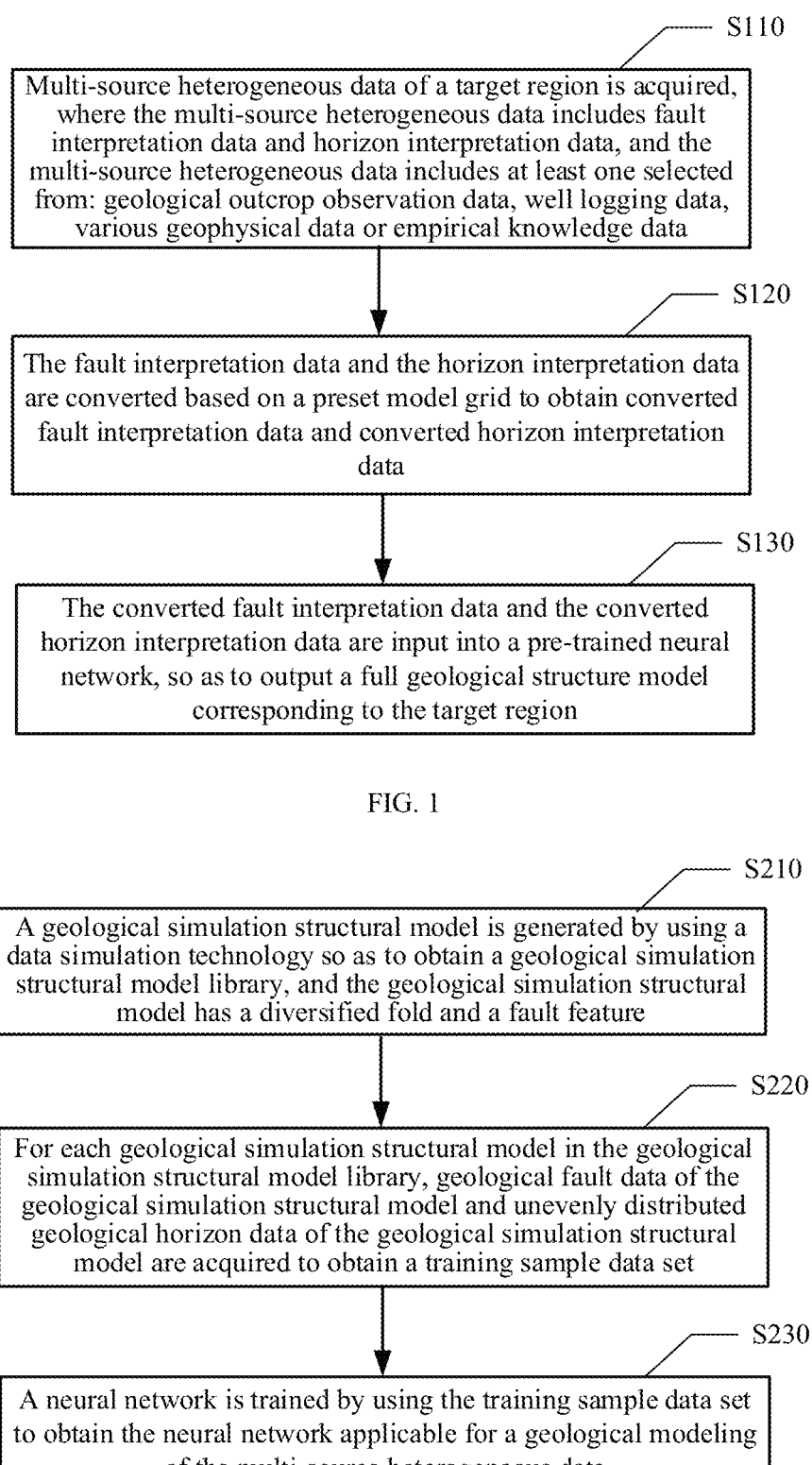

S110

Multi-source heterogeneous data of a target region is acquired, where the multi-source heterogeneous data includes fault interpretation data and horizon interpretation data, and the multi-source heterogeneous data includes at least one selected from: geological outcrop observation data, well logging data, various geophysical data or empirical knowledge data

S120

The fault interpretation data and the horizon interpretation data are converted based on a preset model grid to obtain converted fault interpretation data and converted horizon interpretation data

S130

The converted fault interpretation data and the converted horizon interpretation data are input into a pre-trained neural network, so as to output a full geological structure model corresponding to the target region

A geological simulation structural model is generated by using a data simulation technology so as to obtain a geological simulation structural model library, and the geological simulation structural model has a diversified fold and a fault feature

S220

For each geological simulation structural model in the geological simulation structural model library, geological fault data of the geological simulation structural model and unevenly distributed geological horizon data of the geological simulation structural model are acquired to obtain a training sample data set

S230

A neural network is trained by using the training sample data set to obtain the neural network applicable for a geological modeling of the multi-source heterogeneous data

FIG. 2

METHOD OF MODELING INTERACTIVE INTELLIGENT THREE-DIMENSIONAL IMPLICIT STRUCTURE BASED ON DEEP LEARNING

CROSS REFERENCE TO RELATED APPLICATION(S)

This application is a U.S. National Stage Filing under 35 U.S.C. § 371 from International Application No. PCT/CN2022/125275, filed on Oct. 14, 2022, which claims priority to Chinese Patent Application No. 202211064255.5 entitled "METHOD OF MODELING INTERACTIVE INTELLIGENT THREE-DIMENSIONAL IMPLICIT STRUCTURE BASED ON DEEP LEARNING", filed on Aug. 31, 2022, and Chinese Patent Application No. 202211240817.7 entitled "METHOD OF MODELING GEOLOGICAL STRUCTURE BASED ON MULTI-SOURCE HETEROGENEOUS DATA", filed on Oct. 11, 2022, the entire contents of each of which are incorporated herein in their entireties by reference.

TECHNICAL FIELD

The present disclosure relates to a field of a geological exploration and artificial intelligence technology, in particular to a method of modeling an interactive intelligent three-dimensional implicit structure based on deep learning.

BACKGROUND

A reliable geological structural model is very important for a series of scientific research problems, such as fully understanding an underground space organization, quantitatively simulating various geological processes, etc. Geological modeling is intended to establish a numerical model of a geological condition by using various mathematical methods, so as to accurately express a spatial position and a geometric relationship thereof. In a related technology, an implicit method is generally used for the geological modeling, and the implicit method may compute a spatial scalar function using structural data so as to represent all geological structural features in the whole region. In the function, a geological interface is represented as an iso-surface, and a fault and an unconformity are represented as discontinuous changes of a function value. The function is also called an implicit structural model.

SUMMARY

The present disclosure provides a method of modeling an interactive intelligent three-dimensional implicit structure based on deep learning.

According to an aspect of the present disclosure, a method of modeling an interactive intelligent three-dimensional implicit structure based on deep learning is provided, including:

acquiring multi-source heterogeneous data about a target region, where the multi-source heterogeneous data includes fault interpretation data and horizon interpretation data, and the multi-source heterogeneous data includes at least one selected from: geological outcrop observation data, well logging data, various geophysical data or empirical knowledge data;

converting the fault interpretation data and the horizon interpretation data based on a preset model grid to obtain converted fault interpretation data and converted horizon interpretation data; and inputting the converted fault interpretation data and the converted horizon interpretation data into a pre-trained neural network, so as to output a full geological structure model corresponding to the target region.

Another aspect of the present disclosure provides an apparatus of modeling an interactive intelligent three-dimensional implicit structure based on deep learning, including:

an acquisition module configured to acquire multi-source heterogeneous data about a target region, where the multi-source heterogeneous data includes fault interpretation data and horizon interpretation data, and the multi-source heterogeneous data includes at least one selected from: geological outcrop observation data, well logging data, various geophysical data or empirical knowledge data;

a conversion module configured to convert the fault interpretation data and the horizon interpretation data based on a preset model grid to obtain converted fault interpretation data and converted horizon interpretation data; and an input-output module configured to input the converted fault interpretation data and the converted horizon interpretation data into a pre-trained neural network, so as to output a full geological structure model corresponding to the target region.

Another aspect of the present disclosure provides an electronic device, including: one or more processors; a memory configured to store one or more programs. The one or more programs, when executed by the one or more processors, are used to cause the one or more processors to implement the method as described above.

Another aspect of the present disclosure further provides a computer-readable storage medium having executable instructions stored thereon. The instructions, when executed by a processor, are used to cause the processor to implement the method as described above.

Another aspect of the present disclosure further provides a computer program product, including a computer program. The computer program, when executed by a processor, is used to cause the processor to implement the method as described above.

BRIEF DESCRIPTION OF THE DRAWINGS

The above contents and other objectives, features, and advantages of the present disclosure will be clearer through the following descriptions of embodiments of the present disclosure with reference to accompanying drawings, in which:

FIG. 1 schematically shows a flowchart of a method of modeling an interactive intelligent three-dimensional implicit structure based on deep learning according to embodiments of the present disclosure;

FIG. 2 schematically shows a flowchart of a method of training a neural network according to embodiments of the present disclosure;

DETAILED DESCRIPTION OF EMBODIMENTS

Figure 3A:
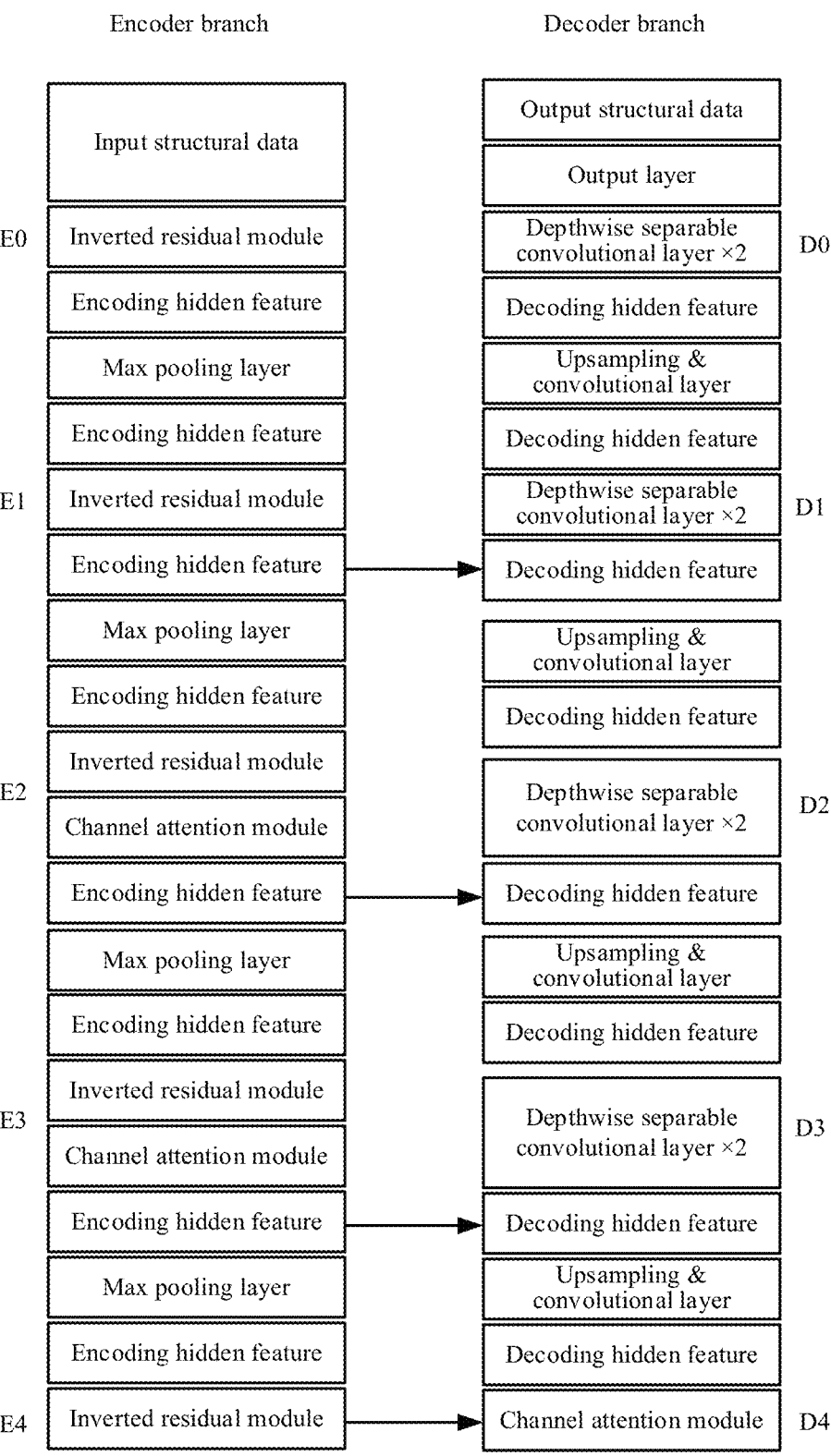
FIG. 3A schematically shows an architecture diagram of a neural network according to embodiments of the present disclosure.

Embodiments of the present disclosure will be described below with reference to accompanying drawings. It should be understood, however, that these descriptions are merely exemplary and are not intended to limit the scope of the present disclosure. In the following detailed descriptions, for the convenience of explanation, many specific details are set forth to provide a comprehensive understanding for embodiments of the present disclosure. However, it may be obvious that one or more embodiments may be implemented without these specific details. In addition, in the following descriptions, descriptions of well-known structures and technologies are omitted to avoid unnecessarily confusing the concept of the present disclosure.

Terms used herein are only intended to describe specific embodiments and are not intended to limit the present disclosure. Terms "include", "comprise", "contain", etc. used herein indicate the presence of the described features, steps, operations and/or components, but do not exclude the presence or addition of one or more other features, steps, operations and/or components.

All terms (including technical and scientific terms) used herein have meanings generally understood by those of ordinary skilled in the art, unless otherwise defined. It should be noted that the terms used herein should be interpreted as having the meaning consistent with the context of the present disclosure, and should not be interpreted in an idealized or overly rigid manner.

In a case that an expression similar to "at least one selected from A, B, or C" is used, the expression should generally be interpreted according to the meaning of the expression generally understood by those of ordinary skilled in the art (for example, "a system having at least one selected from A, B, or C" shall include, but is not limited to, a system having A alone, having B alone, having C alone, having A and B, having A and C, having B and C, and/or having A, B and C, etc.).

A construction of a reliable geological structural model is very important for a series of scientific research problems, such as fully understanding an underground space organization, quantitatively simulating various geological processes, etc. Geological modeling is intended to establish a numerical model of a geological condition by using various mathematical methods, so as to accurately express a spatial position and a geometric relationship thereof. Structural modeling is mainly an explicit or curve modeling method, which may directly express a geological structure using geometrical features such as a point, a line, a surface, etc. Since various geological interfaces are provided in a geological body, when situations such as an unconformity, a fault dislocation, a stratigraphic pinch-out, etc. occur, the modeling may face a complex problem of dealing with a geological interface intersection relationship, and a close relationship is provided between the structures, and any error may affect a modeling result. Therefore, a modeling technology in a related technology usually requires a strict quality control to ensure a geological rationality and a numerical stability of the model. This may cause a low efficiency of the method in dealing with a complex structural modeling problem and cause very difficult updating of the model. In addition, a modeling process may be affected by subjective factors and experience of geologists, which may make it difficult to reproduce the same result even if the same structural data are input.

Compared with an explicit method, an implicit modeling method has highly efficient, renewable and reproducible features. The implicit modeling method may compute a spatial scalar function using structural data so as to represent all geological structural features in the whole region. In the function, a geological interface is represented as an iso-surface, and a fault and an unconformity surface are represented as discontinuous changes of a function value. The function is also called an implicit structural model. The implicit modeling method may fuse all available geological information into the model by integrating structural observation data and geological empirical knowledge, so as to reconstruct an underground structural feature from a global perspective.

Input data of the implicit modeling method usually includes various types of modeling objects, such as a space point, a vector, a polyline and a curved surface observed in the field and explained by experts. Geologists and geophysicists infer a possible structural combination from observed data by combining empirical knowledge, so as to constrain a possible geometric relationship between geological interfaces, thereby guiding a modeling behavior of the implicit method. A structural feature of the model should conform to geological understanding and follow a known structural feature in the input data. Since a local distribution of an underground space is only observed in limited regions (such as highly developed mines and oil fields), it is almost impossible to directly acquire a true situation of a full geological structure. Therefore, it is required to additionally introduce a geological rule and assumption into the method to constrain the modeling process. For example, an implicit interpolation in the related technology adopts an explicit smoothing criterion to simplify a local variation of the model, so that a stable and reliable result may be acquired.

For example, a Discrete Smoothing Interpolation (DSI) is an implicit method to compute a geological model by discretizing a scalar function on a spatial grid. In the DSI and a variant method thereof, the modeling process is expressed as solving a least square minimization problem with a smoothing constraint to estimate a scalar field compatible with an input. The smoothing constraint introduces the empirical knowledge into the modeling process, and a basic assumption thereof is that an expected model should be as smooth as possible, that is, a change of a local structure should be as small as possible. However, because the scalar function is always continuous on a grid unit, a model grid unit may not span a discontinuous structure, and the method may not correctly estimate a gradient field near the fault or the unconformity surface. In order to solve the problem, it is required to compute an irregular grid by independently modeling the discontinuous structure to constrain the modeling behavior, so as to ensure that the method is still effective in these cases. Besides the DSI, a potential field method (PFM) is another implicit method.

The PFM expresses the structural modeling as a double Cokriging interpolation or a radial basis function interpolation problem. Compared with the DSI, although the models are all defined on a volume grid, the PFM does not need to define any grid when computing the scalar function. The modeling result depends entirely on a distribution of observed data, and an influence range of each data point is determined by a selected interpolation operator. However, the PFM usually solves a complex mathematical equation to adjust an influence of the interpolation operator in the whole region of interest, so as to acquire a result that conforms to a geological significance. However, this may also lead to a rapid increase in a computational cost with a size of the input data.

Although the method in the related technology has many advantages, it is still a challenging task to deal with the geological model a structurally complex region in terms of maintaining a geological consistency between the model and the input data, and a reliability of the modeling depends on an availability and a quality of the observation data. In some complex geological environments, if a data sampling is sparse or unevenly distributed, the modeling behavior completely guided by a mathematical equation may not always produce a geologically effective model. A corresponding model may produce a wrong geometric feature incompatible with the geological understanding or a related structural spatial relationship. The problem is mainly attributed to a relatively limited geometric feature allowed by the interpolation operator. In the related technology, all input data and prior knowledge are mathematically expressed as a linear constraint to compute a continuous scalar field as smoothly as possible. Although the assumption is helpful to derive a specific geological model, an application of the smoothness criterion may affect an influence of a local geological change and have a negative impact on a modeling accuracy of a structurally highly complex region. Since a flexibility of the modeling is limited to a geometric relationship that may be expressed by a specific interpolation operator, the implicit method is usually negatively affected, so that a geologically unreasonable geometric feature or illusion may be generated.

Therefore, the geological modeling is expressed as a least squares or spatial interpolation problem, and an optimal solution is solved based on various mathematical formulas under an assumption of a smooth regularization. When known data is too sparse or unevenly distributed, it is difficult for the method in the related technology to reasonably represent a complex geological geometric feature and relationship, and an iterative solution of a large-scale equation may have a very low efficiency in dealing with a three-dimensional model.

In view of this, the present disclosure proposes an interactive implicit modeling method (also known as Deep-ISMNet) using a convolutional neural network (CNN) for the above-mentioned technical problem. A full geological model is constructed from a small amount of structural data by using the convolutional neural network. Based on an automatically generated simulation model sample library, the network may flexibly integrate various geological constraints and prior knowledge in a training process, which may effectively break a performance bottleneck of a geological modeling technology in the related technology. In addition, an available multi-source heterogeneous information is transformed into a form of matrix or tensor data as an input, so that a trained network may quickly generate the model that conforms to the geological understanding and is compatible with a known structural feature by using a small amount of data in many practical modeling applications.

The method provided by embodiments of the present disclosure belongs to a data-driven statistical algorithm, which may estimate a mapping function by minimizing a given quality evaluation standard based on the empirical knowledge and a sample example. The function may map the input data to an expected output. Compared with the related technology, an advantage of a deep learning is to solve a large linear or nonlinear equation system without an expensive computational cost in a prediction process. In a field of a computer image, the CNN shows an outstanding ability in analyzing a geometric feature and capturing a complex nonlinear mapping relationship between an input and an output. In order to find a best compromise between an accuracy and an efficiency, a plurality of learning units may be provided to construct an architecture of the CNN, such as a depthwise separable convolution, an attention mechanism, a residual learning module, etc. The deep learning provides a more flexible framework for introducing various structural constraints and the empirical knowledge in the modeling process, thereby showing an excellent performance in dealing with implicit and discrete data. Furthermore, the input sparse structural data may be derived from various data sources, including a geological outcrop observation, well logging data, various geophysical data, expert empirical knowledge, etc. In the method provided by the present disclosure, the network may efficiently compute the implicit structural model that fits various geological data by uniformly transforming the multi-source heterogeneous information into the form of matrix or tensor data as the input.

Specifically, embodiments of the present disclosure provide a method of modeling an interactive intelligent three-dimensional implicit structure based on deep learning, including:

acquiring multi-source heterogeneous data about a target region, where the multi-source heterogeneous data includes fault interpretation data and horizon interpretation data, and the multi-source heterogeneous data includes at least one selected from: geological outcrop observation data, well logging data, various geophysical data or empirical knowledge data;

converting the fault interpretation data and the horizon interpretation data based on a preset model grid to obtain converted fault interpretation data and converted horizon interpretation data; and inputting the converted fault interpretation data and the converted horizon interpretation data into a pre-trained neural network, so as to output a full geological structure model corresponding to the target region.

FIG. 1 schematically shows a flowchart of a method of modeling an interactive intelligent three-dimensional implicit structure based on deep learning according to embodiments of the present disclosure.

As shown in FIG. 1, the method of modeling the interactive intelligent three-dimensional implicit structure based on deep learning of such embodiments includes operations S110 to S130.

In operation S110, multi-source heterogeneous data of a target region is acquired, where the multi-source heterogeneous data includes fault interpretation data and horizon interpretation data, and the multi-source heterogeneous data includes at least one selected from: geological outcrop observation data, well logging data, various geophysical data or empirical knowledge data.

According to embodiments of the present disclosure, the method further includes: acquiring the multi-source heterogeneous data corresponding to the target region from a geological construction database by calling a data interface.

According to embodiments of the present disclosure, the fault interpretation data and the horizon interpretation data may be fault interpretation data and horizon interpretation data obtained by manually converting the geological outcrop observation data, the well logging data, the various geophysical data and the empirical knowledge data.

In operation S120, the fault interpretation data and the horizon interpretation data are converted based on a preset model grid to obtain converted fault interpretation data and converted horizon interpretation data.

According to embodiments of the present disclosure, converting the fault interpretation data and the horizon interpretation data by using the preset model grid to obtain the converted fault interpretation data and the converted horizon interpretation data includes: marking, for each fault in the fault interpretation data, a point within a grid from the fault as a first value to obtain the converted fault interpretation data; and marking, for each horizon in the horizon interpretation data, a point within a grid from the horizon as a second value to obtain the converted horizon interpretation data, where the second value is an ordinate average value of all scattered points on the horizon.

According to embodiments of the present disclosure, the acquired multi-source heterogeneous data is transmitted to the preset model grid, so as to facilitate a conversion of the fault interpretation data and the horizon interpretation data.

According to embodiments of the present disclosure, a network is applied to actual structural interpretation data of different regions to acquire a corresponding full geological structural model. Because structural interpretation data is usually not necessarily located on a regular grid, before a practical application, it is needed to convert the horizon interpretation data and the fault interpretation data into a modeling grid, and acquire structural data to be input into the network. An output of the network is an implicit structural model that is compatible with an input structural feature and is geologically reasonable. A full geological horizon surface and a full fault surface may be respectively obtained by extracting a model iso-surface and a discontinuous skip feature.

In operation S130, the converted fault interpretation data and the converted horizon interpretation data are input into a pre-trained neural network, so as to output a full geological structure model corresponding to the target region.

According to embodiments of the present disclosure, an underground structural feature may be restored according to the full geological structural model corresponding to the target region, and a structural feature may be visually displayed, so as to facilitate an exploration of an underground natural resource and a prevention and control of a geological disaster according to the underground structural feature.

According to embodiments of the present disclosure, in a case that the visually displayed structural feature does not conform to geological knowledge, the structural feature may be adjusted by adjusting a structural parameter in the geological structural model, and a real-time interactive capability of the geological structural model may be realized by visually displaying the structural feature in real time.

FIG. 2 schematically shows a flowchart of a method of training a neural network according to embodiments of the present disclosure.

As shown in FIG. 2, the method of training the neural network of such embodiments includes operations S210 to S230.

In operation S210, a plurality of geological simulation structural models are generated by using a data simulation technology so as to obtain a geological simulation structural model library, and the geological simulation structural model has a diversified fold and a fault feature.

According to embodiments of the present disclosure, the generating a plurality of geological simulation structural models by using a data simulation technology so as to obtain a geological simulation structural model library includes: constructing an initial geological simulation structural model, where the initial geological simulation structural model is a layered model constant in a horizontal direction and monotonically increasing in a vertical direction, and the initial geological simulation structural model includes at least one structural parameter; where the structural parameter includes at least one selected from a folding parameter, an inclination parameter or a faulting structural parameter; and adjusting, for each of the at least one structural parameter, the structural parameter within a preset range to obtain the geological simulation structural model library.

According to embodiments of the present disclosure, considering that a training data set should contain models with various structural patterns as much as possible, the convolutional neural network CNN may learn representative knowledge to realize a generalization in various applications in a field of geological modeling. However, since a true situation of an underground space may not be acquired, it is difficult to understand all geological structures in a certain region by a manual interpretation. In order to solve the problem, a workflow of generating a series of typical folding and faulting structures by using a set of random parameters and acquiring a large number of training samples by a data simulation is proposed. Firstly, in the workflow, a layered model with a horizontally constant value and a vertically monotonical incremental value is used as an initial structural model, and then folding, dipping and faulting structures are added to the model in sequence, which may gradually complicate a geometric feature of the model. By randomly selecting parameters within a reasonable range, various structural models that conform to the geological understanding may be generated and are not limited to a specific geometric pattern.

According to embodiments of the present disclosure, based on a geological assumption of typical folding and faulting patterns, a data simulation method performs a parameterization representation on a deformation process of strata folding, dipping and faulting structures. Structural models that are different from each other and realistic may be created by only randomly providing a set of parameters within a predefined reasonable range, so that training sample data may be enriched and a generalization ability of the geological structural model may be improved.

It should be noted that a preset range corresponding to each of the above-mentioned structural parameters may be determined based on data from different data sources. For example, the data source may include a geological outcrop observation, well logging data, various geophysical data, expert empirical knowledge, etc.

In operation S220, for each geological simulation structural model in the geological simulation structural model library, geological fault data of the geological simulation structural model and unevenly distributed geological horizon data of the geological simulation structural model are acquired to obtain a training sample data set.

According to embodiments of the present disclosure, each training sample data in the training sample data set includes a geological simulation structural model and the geological fault data and the geological horizon data corresponding to the geological simulation structural model, and the geological simulation structural model, fault data and horizon data are used as training labels together.

According to embodiments of the present disclosure, in a phase of training the neural network, the geological horizon data and the geological fault data are used as input data, the neural network outputs a full implicit geological structural model. The geological simulation structural model itself and input structural data are used as labels for training the neural network, so as to provide a supervision on a predicted result.

According to embodiments of the present disclosure, the acquiring geological fault data of the geological simulation structural model and unevenly distributed geological horizon data of the geological simulation structural model to obtain a training sample data set includes: extracting a discontinuous feature in the geological simulation structural model to obtain the geological fault data; selecting a preset number of iso-surfaces from iso-surfaces of the geological simulation structural model to obtain a target iso-surface set; dividing, for each target iso-surface in the target iso-surface set, scattered point data on the target iso-surface into a plurality of data intervals according to an ordinate value range; randomly discarding a second preset number of data intervals in the plurality of data intervals, and determining scattered point data in remaining data intervals as the geological horizon data; and generating training sample data according to the geological fault data, the geological horizon data and the geological simulation structural model to finally obtain the training sample data set.

According to embodiments of the present disclosure, a method of extracting the geological horizon data includes: arranging all scattered points on a single horizon in a descending order according to the ordinate, and dividing the scattered points into a plurality of evenly spaced intervals according to an ordinate value range, and then randomly discarding all scattered points in one or more intervals, so that horizon data similar to a manual interpretation may be generated. In addition, in each input data generation process, some parts are randomly deleted from horizon scattered point data to simulate sparse and unevenly distributed horizon interpretations in an actual situation.

According to embodiments of the present disclosure, the selecting a preset number of iso-surfaces from iso-surfaces of the geological simulation structural model to obtain a target iso-surface set includes: dividing a value range of all iso-surfaces in the geological simulation structural model into at least one numerical interval in a descending order;

randomly selecting, for each of the at least one numerical interval, a numerical value from the numerical interval to obtain a target numerical value; and determining an iso-surface corresponding to the target numerical value as a target iso-surface to obtain the target iso-surface set.

According to embodiments of the present disclosure, since the iso-surface in the geological simulation structural model represents a corresponding geological sequence interface, and a skip change of a local scalar value thereof represents a discontinuous structure such as a fault or an unconformity surface, the geological simulation structural model itself may be regarded as an implicit scalar function.

According to embodiments of the present disclosure, since the geological horizon surface is implicitly embedded in the simulation structural model, the horizon scattered point data may be acquired by an iso-surface extraction method. In order to avoid introducing a specific sampling pattern into the training data or generating closely adjacent different horizons, the present disclosure divides a value range of the geological simulation structural model into several groups of evenly spaced intervals in a descending order, and then a value is randomly selected in each interval and a corresponding iso-surface of the value is extracted.

According to embodiments of the present disclosure, the above-mentioned method further includes that: an input of the neural network is scattered point data representing horizon and fault positions. Before inputting the horizon data and the fault data into the neural network, the horizon data and the fault data need to be converted into a regular model network, and the input data only has a valid value on a known structural feature, and the rest of values are 0.

According to embodiments of the present disclosure, a method of converting the horizon data and the fault data to the regular model network includes: marking, for each fault in the fault data, a point within a grid from the fault as a first value to obtain the converted fault data; determining, for each horizon in the horizon data, a point within a grid from the horizon as a corresponding scalar value in the geological simulation structural model to ensure that scattered points on a same horizon have a same value or label, so as to obtain converted horizon data.

In operation S230, a neural network is trained by using the training sample data set to obtain the neural network applicable for a geological modeling of the multi-source heterogeneous data.

According to embodiments of the present disclosure, the training a neural network by using the training sample data set to obtain the neural network applicable for a geological modeling of the multi-source heterogeneous data includes: inputting the fault data and the horizon data into the neural network, so as to output the geological structural model; inputting the output geological modeling result and the simulation structural model into a mixed loss function, so as to output a loss result, where the mixed loss function combines a regression loss based on a single point with a multi-scale structural similarity based on a local sliding Gaussian window; adjusting a network parameter of the neural network according to the loss result until the mixed loss function meets a preset condition (e.g., reaches a preset number of iterations); and determining the neural network obtained in response to the mixed loss function meeting the preset condition as the trained neural network.

According to embodiments of the present disclosure, since the geological simulation structural model generated by the data simulation technology has complex faulting and folding structures, a richness of training samples may be improved, which may effectively support an initial neural network to learn a representative structural pattern and a geological geometric feature that is difficult to be described by mathematical means in the related technology. At the same time, the training method provided by the present disclosure may flexibly introduce various geological constraints and prior knowledge in a way of loss function in a training process, which may effectively break a performance bottleneck of a geological modeling technology and improve an accuracy of geological structural modeling.

According to embodiments of the present disclosure, the above-mentioned training method further includes: accelerating a network convergence by using an Adam optimizer with an adaptive learning step size, and an initial learning rate is set to 0.01. When the loss function stops decreasing in two iterations, a current learning rate is set to half of the previous one. The network training stops after 120 cycles, and a training and verification loss curve gradually converges (less than 0.1). This shows that the CNN has successfully learned the geometric feature and a combination rule of different geological structures from a training data sample.

According to embodiments of the present disclosure, the neural network iteratively optimizes the network parameter by minimizing an error between a predicted model and a reference model, and finally realizes a generalization of the network parameter on actual data. In order that the network makes an effective prediction in geological sense, the regression loss and the multi-scale structural similarity are combined to define the mixed loss function for the network training.

In an embodiment, the mixed loss function is defined as follows:

x is set as a reference structural model, and m is set as a binary mask of the reference structural model. A sampling point corresponding to input horizon data in the mask is set to 1, and the rest are set to 0. Dimensions of x and m are consistent with samples in the training data set. For each reference model x, a CNN network with a trainable parameter uses horizon data $h=x \odot m$ and fault data f as inputs to generate a predicted model $\hat{y}=f_\theta(h, f)$. The predicted model replaced with the input data near a known horizon may be expressed as $y=\hat{y} \odot (1-m)+x \odot m$.

In many regression problems, a mean square error (MSE) and a mean absolute error (MAE) are usually used to measure an accuracy of the method point by point in the result. The MSE emphasizes a sampling point with a larger error and is more tolerant of a sampling point with a smaller error, and does not consider a potential spatial distribution pattern of data. Compared with the MSE, the MAE is more sensitive to a change of local data, which may reduce an illusion introduced in the result due to an excessive punishment of the sampling point with the larger error. We use a weighted MAE as one of mixed loss functions, which is expressed as follows:

$$\mathcal{L}_{mae}(p) = \frac{1}{N} \sum_{p \in p} |x(p) - \hat{y}(p)|, \tag{1}$$

p represents a local square region cut from a same position in two compared models, and N represents a total number of sampling points in the region p.

Although the MAE is better than the MSE in a geological modeling scenario, the result is still not optimal. The CNN trained using the MAE alone may not be able to correctly extract the geometric feature represented by a distribution of adjacent sampling points, and blur a high-frequency and sharp structural discontinuity. Therefore, the models with similar MAEs may have quite different structures, and thus may have a negative impact on a network optimization. In order to avoid a smoothing effect of the MAE, a mixed loss function is defined by combining the MAE with a structural similarity (SSIM). The SSIM may better preserve a high-frequency geometric feature by adaptively assigning a higher weight at a structural boundary with a great difference. An SSIM loss used to measure the reference model and the predicted model in the region p may be expressed as follows:

$$L_{ssim}(p) = 1 - \left(\frac{2\mu_x\mu_y + C_1}{\mu_x^2 + \mu_y^2 + C_1}\right)^\beta \left(\frac{2\sigma_{xy} + C_2}{\sigma_x^2 + \sigma_y^2 + C_2}\right)^\gamma = 1 - 1(p)^\beta \cdot cs(p)^\gamma \tag{2}$$

$\mu_x$ and $\mu_y$ represent mean values of models x and y in a local region, respectively. $\sigma_x$ and $\sigma_y$ represent variances, and $\sigma_{xy}$ represents a covariance of the two. The mean value, the variance and the covariance may be computed by using an isotropic Gaussian filter $G_{\sigma_g}$ with a standard deviation of $\sigma_g$ and a mean value of zero, so as to improve a computing efficiency. $\mu_x$ and $\mu_y$ measure changes of a stratigraphic sequence and a structure in the local region of the model, $\sigma_x$, $\sigma_y$ and $\sigma_{xy}$ measure a relative changing trend of a local region structure of the compared model, and they together represent a structural similarity of the two geological models. Parameters $\beta$ and $\gamma$ define a relative importance of a mean term and a variance term in a loss function. According to a pre-experimental result, the two parameters are set to 1. In addition, Formula (2) uses smaller constant factors $C_1$ and $C_2$ to avoid an unstable numerical value caused by division by zero. The standard deviation $\sigma_g$ of the Gaussian filter $G_{\sigma_g}$ is a hyperparameter, which needs to be determined before training the network. A selection of a may affect an effect of the network training. Training with a larger $\sigma_g$ may make the network overemphasize a local change and produce a false feature at an edge of the structure. However, training with a smaller $\sigma_a$ may blur a structure and a stratigraphic boundary. In order to avoid adjusting the parameters, a multi-scale structural similarity (MS-SSIM) is used in the present disclosure, which is expressed as follows:

$$\mathcal{L}_{ms-ssim}(p) = 1 - l_S(p)^\beta \cdot \prod_{j=1}^S cs_j(p)^{\gamma_j} \tag{3}$$

A parameter $\gamma_j$ defines a relative importance of variance terms of different scales in Formula (3). The MS-SSIM creates a series of local Gaussian windows from large to small by using different standard deviations $\sigma_g$, and simultaneously estimates the structural similarity of the model in a plurality of windows. In order to improve the computing efficiency, the present disclosure avoids directly defining the Gaussian standard deviation $\sigma_g$, but performs five consecutive 28282 average pooling operations on the model in the local region p, thereby acquiring five equivalent spatial scales. In addition, structural similarity losses estimated from different spatial scales may be adjusted by using a weight coefficient $\gamma_j=\{0.05, 0.29, 0.3, 0.24, 0.12\}$, so as to ensure that a sum of the structural similarity losses is equal to 1.

Although the MS-SSIM emphasizes a change (a range thereof is defined by the Gaussian standard deviation $\sigma_g$) of the structural feature near a single sampling point in the model, the illusion may be still introduced in the prediction. This is because it is difficult to correctly compute a derivative at the boundary in the local region during the network training.

In addition, the MS-SSIM is insensitive to an average deviation of predicted values, which may lead to a change of the stratigraphic sequence or a disturbance of a geological interface in the modeling result. In contrast, although the structural feature with a high contrast may not be preserved, the MAE may minimize an average error of each sampling point in the model, so the stratigraphic sequence may be better reconstructed and a boundary illusion may be eliminated. In order to obtain advantages of two loss functions simultaneously, a weighted mixed loss function is proposed:

$$\mathcal{L}_{sum} = \frac{1}{K}\sum_{i=1}^{K} (\lambda \mathcal{L}_{mae}(p_i) + \mathcal{L}_{ms-ssim}(p_i)), \qquad (4)$$

$\lambda$ is a weighting factor for balancing different loss terms, and K represents a total number of local regions p in the model. When training the CNN, the local region is cut point by point from the two compared models, and a loss in each region is computed according to Formula (4). According to the pre-experimental result, a size of the local region is set to 7, and $\lambda$ is set to 1.25. A final loss is a mean value of the loss functions in all local regions.

According to embodiments of the present disclosure, a modeling performance may be improved by using a mixed function based on a single point accuracy and the structural similarity when updating the neural network.

Table 1 shows a quantitative analysis of the network trained with different loss functions by using various quantitative evaluation indexes, and average scores of these indexes on validation set.

TABLE 1

| Quality evaluation | Network training loss function | | | | | |
|---|---|---|---|---|---|---|
| index | L1 | L2 | SmoothL1 | MS-SSIM | MS-SSIM&L1 | MS-SSIM&L2 |
| SSIM | 0.991 | 0.989 | 0.990 | 0.991 | 0.993 | 0.990 |
| EVS | 0.994 | 0.995 | 0.995 | 0.994 | 0.996 | 0.995 |
| MAE | 0.017 | 0.017 | 0.017 | 0.017 | 0.016 | 0.016 |
| MSE810$^{-1}$ | 0.005 | 0.005 | 0.005 | 0.005 | 0.004 | 0.004 |
| R2S | 0.986 | 0.987 | 0.988 | 0.986 | 0.988 | 0.987 |
| MDAE | 0.016 | 0.016 | 0.017 | 0.016 | 0.015 | 0.015 |
| HFA | 0.527 | 1.321 | 0.511 | 0.630 | 0.331 | 1.040 |

As shown in Table 1, the CNN trained using MS-SSIM and MAE mixed loss functions (represented by MS-SSIM and L1) is superior to other loss functions in Table 1 in all quality indexes, even including quality indexes for the network training. An excellent performance of the loss function is attributed to a fact that a structure related to the fault and the unconformity surface in the model is better reconstructed by assigning a high weight to a region with a large local structural difference, and an accurate identification of the fault is helpful to constrain a horizontal changing trend of a stratigraphic interface across a structural discontinuity.

According to embodiments of the present disclosure, a knowledge closed loop is formed by a data simulation and model training method, and the proposed method may effectively support the network to learn a representative structural pattern and a geological geometric feature that is difficult to be described by mathematical means in the related technology, so that it is hopeful to break through a performance bottleneck of a current modeling method in a complex structural environment.

According to embodiments of the present disclosure, the present disclosure may realize a construction interpolation process through a multi-layer spatial convolution with a trainable kernel parameter. A convolutional layer of the CNN may be regarded as an implicit interpolation operator in the related technology. However, the difference is that a convolution kernel parameter of the network may be optimized by training. By using a large number of simulation sample data for training, complex geological knowledge and a structural pattern involved in a structural forward modeling process are implicitly embedded in the neural network, which may effectively ensure a generalization ability of the method in an actual data application. In addition, relying on a graphics processor GPU parallel computing platform, the trained network is not limited to a specific format of input data in various geological modeling applications, the input data is flexible, and the input data may be changed in real time, which may realize a real-time interactive geological structural modeling.

According to embodiments of the present disclosure, the training method further includes: performing a normalization processing on the geological simulation structural model by using a preset normalization method, so as to obtain a normalized geological simulation structural model; where the acquiring geological fault data of the geological simulation structural model and unevenly distributed geological horizon data of the geological simulation structural model to obtain a training sample data set includes: extracting geological fault data of the normalized geological simulation structural model and geological horizon data of the normalized geological simulation structural model to obtain the training sample data set.

According to embodiments of the present disclosure, considering that a coordinate range of an actual geological data set may be quite different from each other, it is needed to scale the structural data in a phase of training the geological structural model to obtain the normalized geological simulation structural model with a range of 0 to 1. When normalizing the training data, scattered points on a same geological interface are assigned to corresponding values in a normalized model.

According to embodiments of the present disclosure, the neural network includes an encoder branch and a decoder branch, the encoder branch includes at least one encoding feature processing unit, and the decoder branch includes at least one decoding feature processing unit; and the training a neural network by using the training sample data set includes: inputting the geological fault data and the geological horizon data into the encoder branch, so as to output a final encoding hidden feature after a processing by the at least one encoding feature processing unit in the encoder branch; inputting the final encoding hidden feature into the decoder branch, so as to output a predicted structural model after a processing by the at least one decoding feature processing unit in the decoder branch; inputting the predicted structural model and the simulation structural model into a mixed loss function, so as to output a loss result, where the mixed loss function combines a regression loss based on a single point with a multi-scale structural similarity based on a local sliding Gaussian window; adjusting a network parameter of the neural network according to the loss result until the mixed loss function meets a preset condition; and determining the neural network obtained in response to the mixed loss function meeting the preset condition as the trained neural network.

According to embodiments of the present disclosure, the encoder branch may include five encoding feature processing units connected in sequence.

According to embodiments of the present disclosure, the encoder branch includes a first encoding feature processing unit, a second encoding feature processing unit, a third encoding feature processing unit, a fourth encoding feature processing unit and a fifth encoding feature processing unit that are connected in sequence.

The inputting the geological fault data and the geological horizon data into the encoder branch, so as to output a final encoding hidden feature after a processing by the at least one encoding feature processing unit in the encoder branch includes:

inputting the geological fault data and the geological horizon data into the first encoding feature processing unit to output a first encoding hidden feature;

inputting the first encoding hidden feature into the second encoding feature processing unit to output a second encoding hidden feature;

inputting the second encoding hidden feature into the third encoding feature processing unit to obtain a third encoding hidden feature;

inputting the third encoding hidden feature into the fourth encoding feature processing unit to obtain a fourth encoding hidden feature; and inputting the fourth encoding hidden feature into the fifth encoding feature processing unit to obtain the final encoding hidden feature.

According to embodiments of the present disclosure, the encoding feature processing unit includes an inverted residual module and a max pooling layer, and the inverted residual module includes a dilated convolutional layer, a depthwise separable convolutional layer and a projection convolutional layer; the inputting the geological fault data and the geological horizon data into the encoder branch, so as to output a final encoding hidden feature after a processing by the at least one encoding feature processing unit in the encoder branch includes: inputting the geological fault data and the geological horizon data into the dilated convolutional layer to dilate a feature dimension and output a dilated feature; inputting the dilated feature into the depthwise separable convolutional layer to perform a feature extraction and output an extracted feature; inputting the extracted feature into the projection convolutional layer to perform a dimension reduction processing on the extracted feature and output a first encoding hidden feature; and inputting the first encoding hidden feature into the max pooling layer, so as to output the final encoding hidden feature.

According to embodiments of the present disclosure, the depthwise separable convolutional layer includes a single-channel feature extraction layer and a cross-channel feature fusion layer. The inputting the dilated feature into the depthwise separable convolutional layer to perform a feature extraction and output an extracted feature includes: inputting the dilated feature into the single-channel feature extraction layer to output a single-channel feature; and inputting the single-channel feature into the cross-channel feature fusion layer to fuse the single-channel feature and output the extracted feature.

According to embodiments of the present disclosure, the depthwise separable convolutional layer includes 18181 single-channel feature extraction layers and 18181 cross-channel feature fusion layers, which are used to dilate the input data to a higher-dimensional feature space and map the input data back to an output channel.

FIG. 3A schematically shows an architecture diagram of a neural network according to embodiments of the present disclosure.

Figure 3B:
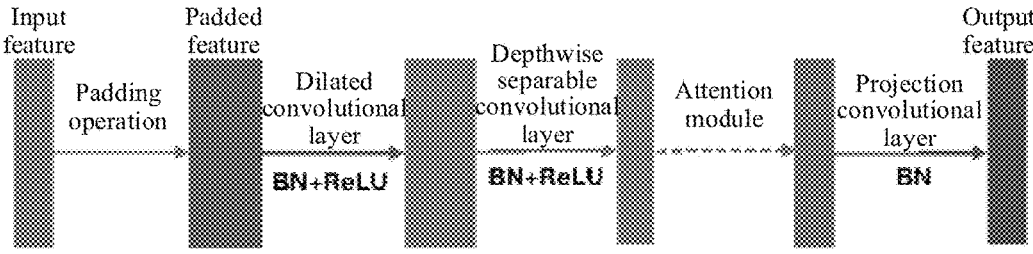
FIG. 3B schematically shows a structural schematic diagram of an inverted residual module according to embodiments of the present disclosure.

FIG. 3B schematically shows a structural schematic diagram of an inverted residual module according to embodiments of the present disclosure.

Figure 3C:
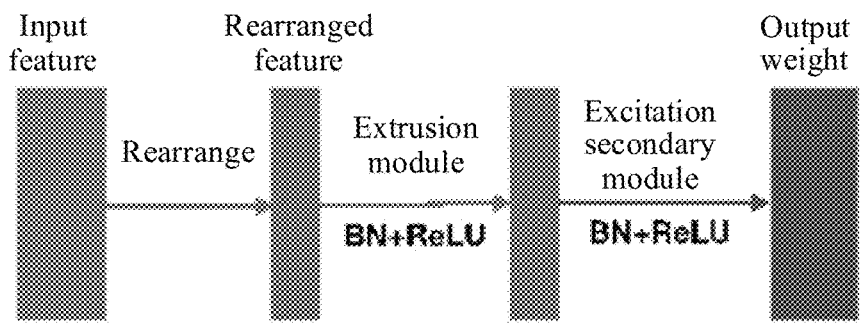
FIG. 3C schematically shows a structural schematic diagram of a channel attention module according to embodiments of the present disclosure.

FIG. 3C schematically shows a structural schematic diagram of a channel attention module according to embodiments of the present disclosure.

As shown in FIG. 3A, the neural network is composed of the encoder branch and the decoder branch. Feature extraction is performed on the input sparse structural data (e.g., the geological fault data and the geological horizon data) in the encoder branch, and then restored to a full implicit structural model in the decoder branch. In an encoder branch portion of the neural network, the input sparse structural data sequentially passes through five encoding feature processing units (i.e., E0 to E4), and each encoding feature processing unit corresponds to a spatial scale. Inputs of other encoding feature processing units other than the E0 unit are outputs of the previous encoding feature processing unit.

In each encoding feature processing unit, an input feature is downsampled using the max pooling layer, and a feature dimension of the input feature is dilated to extract a corresponding spatial scale information. Based on a low rank of the input data, an encoder unit uses a linear bottleneck and an inverted residual structure.

As shown in FIG. 3B, the inverted residual module includes a $1 \times 1 \times 1$ dilated convolutional layer, a $3 \times 3 \times 3$ depthwise separable convolutional layer and a $1 \times 1 \times 1$ projection convolutional layer, and each layer includes a batch normalization (BN) and a nonlinear activation function (ReLu) after convolution. Two $1 \times 1 \times 1$ convolutional layers at the end of the depthwise separable convolutional layer are used to dilate the input to a higher dimensional feature space and map the input back to the output channel. The unit is expressed as a residual learning function by using a local skip connection on the dilated convolutional layer and the projection convolutional layer, which may accelerate a back propagation of a gradient response in the network.

Although an encoder may aggregate rich information, not all features are beneficial to a prediction. Due to a sparsity and a heterogeneity of the input data, a plurality of features unrelated to the geological structure are provided, and most of values in a feature channel are zero. In order to enhance a discriminating learning ability of the encoder branch, a lightweight channel attention module is inserted into the last three encoding feature extraction units of the encoder, that is, the channel attention module is inserted into the inverted residual module.

As shown in FIG. 3C, the channel attention module is composed of an extrusion module and an excitation secondary module. The input feature is retaken through a retake operation, compressed into a low-dimensional feature space in the extrusion module, and then converted into a channel attention weight by the excitation secondary module. This enables the network to adaptively learn a dependency relationship between feature dimensions, so that importance of the feature dimensions in a prediction process may be readjusted by suppressing irrelevant features, so as to improve a network prediction performance.

As shown in FIG. 3A, the decoder branch includes five decoding feature processing units (from D4 to D0) corresponding to the encoder branch, so as to acquire a whole model space receptive field of the network. Each decoding feature processing unit in the decoder branch is responsible for aggregating hidden features from a previous decoding feature processing unit and the encoder skip connection layer, while compensating for a spatial resolution mismatch between different features. At each spatial scale level, a decoder feature is spliced with a corresponding encoder feature (such as hidden features of E3 and D4), and input into two consecutive depthwise separable convolutional layers to further extract an effective information.

The depthwise separable convolutional layer decomposes a convolution operation into two separate steps, including a 3×3×3 convolutional layer for a single-channel feature extraction and a 1×1×1 convolutional layer for a fusion of a cross-channel feature. By decomposing a convolution operation into two steps, the depthwise separable convolution may significantly reduce a computational complexity and a memory occupation, thereby helping to construct a lightweight network. An output layer after the decoder branch uses the 1×1×1 convolutional layer to realize a simple linear transformation, so as to fuse all decoding features and output the modeling result.

According to embodiments of the present disclosure, an encoder-decoder architecture design similar to UNet and a related variant thereof is used in a CNN architecture and improved, so as to find a best compromise between a geological modeling accuracy and a computational efficiency. In the encoder-decoder structure, data input into the network is first downsampled at a plurality of spatial resolutions in the encoder, and then recombined with a corresponding upsampled feature through a skip connection mechanism in the decoder. Therefore, a local feature of the input data is usually extracted in a shallow layer of the CNN, and when a receptive field in a deep convolutional layer becomes larger and larger, the local feature is gradually converted into a high-level global feature. Since the hidden features with different spatial resolutions usually have different geometric information, a systematic aggregation of multi-scale hidden features is helpful for the network to generate a reliable and stable predicted result. In addition, because a structural information may be gradually lost in multiple downsampling, a low-level features extracted from the shallow layer may usually follow the input data better than a deep feature, and use of the skip connection mechanism is helpful for the network to generate a model compatible with a known structure.

According to embodiments of the present disclosure, after CNN training is completed, a modeling experience and knowledge learned from the training sample data set may be implicitly embedded into the network parameter. In order to verify a modeling performance of an obtained address structural model, the trained geological structural model is applied to the geological simulation structural model which is not included in the training sample data set. The geological simulation structural models have complex faulting and folding structures, and a geological interface is transformed by a plurality of high-angle normal faults. In order to test an effectiveness of the method, incomplete horizon data and fault data of the geological simulation structural models are extracted and input into the geological structural model. Although no global information is provided to constrain the structural pattern, the geological structural model may still output a model similar to an input structural feature, and retain a changing trend of the geological interface.

At the same time, in addition to a qualitative analysis, a modeling ability of the network is quantitatively evaluated by using various indexes. The quantitative evaluation indexes include SSIM, MSE, MAE, an explanatory variance score (EVS), a mean square logarithmic error (MSLE), a median absolute error (MDAE) and goodness of fit (R2S). In addition, a modeling accuracy related to an input horizon is measured by computing a horizon fitting accuracy (HFA).

Table 2 shows a quantitative comparison between a construction method and a current mainstream network in a geological modeling problem according to embodiments of the present disclosure.

As shown in Table 2, compared with other methods, the method provided by the present disclosure may not only perform better on all indexes, but also have a more lightweight network architecture, that is, less training parameters and computational complexity. This may enable the method to be applied to a large-scale three-dimensional modeling task. In addition, use of an attention module allows the network to learn an interdependence between different feature dimensions, so as to adaptively emphasize a feature that is helpful to improve the prediction performance and suppress the irrelevant features. Therefore, although dimensions of the features are less than that of a CNN structure (such as UNet) in the related technology, the network may still realize a stable modeling result and a reliable generalization ability on a verification data set.

TABLE 2

| Network architecture | | Computational Cost | | Quality evaluation of structural modeling | | | | | | | |
| --- | --- | --- | --- | --- | --- | --- | --- | --- | --- | --- | --- |
| Type | Skeleton | GFLOPs | #Params[MB] | SSIM | EVS | MAE | MSE810$^{-1}$ | MSLE810$^{-1}$ | R2S | MDAE | HFA |
| UNet | — | 32.715 | 34.526 | 0.989 | 0.990 | 0.019 | 0.009 | 0.005 | 0.972 | 0.017 | 1.078 |
| AttUNet | — | 33.265 | 34.878 | 0.981 | 0.978 | 0.027 | 0.035 | 0.018 | 0.901 | 0.025 | 1.029 |
| NestUNet | — | 76.406 | 39.091 | 0.839 | 0.773 | 0.129 | 0.250 | 0.126 | 0.288 | 0.115 | 3.025 |
| DeepLabv3$^{+}$ | Xception | 10.328 | 54.510 | 0.988 | 0.990 | 0.194 | 0.008 | 0.004 | 0.977 | 0.017 | 1.634 |
| DeepLabv3$^{+}$ | DRNet54 | 23.293 | 40.672 | 0.989 | 0.991 | 0.019 | 0.008 | 0.004 | 0.978 | 0.018 | 1.228 |
| DeepLabv3$^{+}$ | ResNet101 | 11.042 | 59.226 | 0.986 | 0.985 | 0.024 | 0.014 | 0.007 | 0.956 | 0.022 | 1.623 |
| DeepLabv3$^{+}$ | MobileNetv2 | 4.364 | 7.555 | 0.985 | 0.982 | 0.027 | 0.017 | 0.008 | 0.949 | 0.025 | 1.843 |
| RefineNet | MobileNetv2 | 1.015 | 3.250 | 0.973 | 0.963 | 0.031 | 0.035 | 0.019 | 0.887 | 0.028 | 1.223 |
| RefineNet | MobileNetv3 | 0.937 | 2.600 | 0.977 | 0.981 | 0.030 | 0.022 | 0.011 | 0.937 | 0.028 | 1.735 |
| DeepISMNet* | — | 4.711 | 4.300 | 0.993 | 0.996 | 0.016 | 0.004 | 0.002 | 0.988 | 0.015 | 0.331 |

According to embodiments of the present disclosure, in different complex practical data applications, the CNN trained using only simulation data may also show an excellent modeling ability. Different from any explicit mathematical constraint in the implicit method, a modeling process of an intelligent structure based on the CNN is driven by a spatial convolution with a trainable parameter and a loss function providing various geological constraints. The spatial convolution in the network may be equivalent to a local interpolation operator used in the related technology. The only difference is that the spatial convolution may be optimized by training, which may provide more flexibility. Therefore, a geometric feature that is difficult to be accurately expressed in a mathematical model in the related technology may be dealt with. Since the structural modeling depends on an analysis of a spatial distribution and a geometric relationship of observation data, it is very important to provide a representative data sample for training the CNN and realizing a reliable generalization ability of the CNN. The data simulation method used in the present disclosure may generate a large number of realistic structural models, and fully consider a common local missing situation of actual data when constructing the training data set. A combination of a structural forward modeling and the network training may embed various structural patterns and geological laws in the training sample into the neural network in a targeted manner, thereby forming a knowledge closed loop. This is also an important reason why the trained network may be successfully applied to a practical example with different structural patterns. Due to a full automation of the modeling process and an efficient implementation based on a parallel computing platform, the network may perform real-time modeling of input structural data through a human interaction. For example, the same set of input data is randomly disturbed to generate a plurality of modeling results, and then a geological uncertainty and a structural consistency in a structural interpretation are analyzed.

Figure 4:
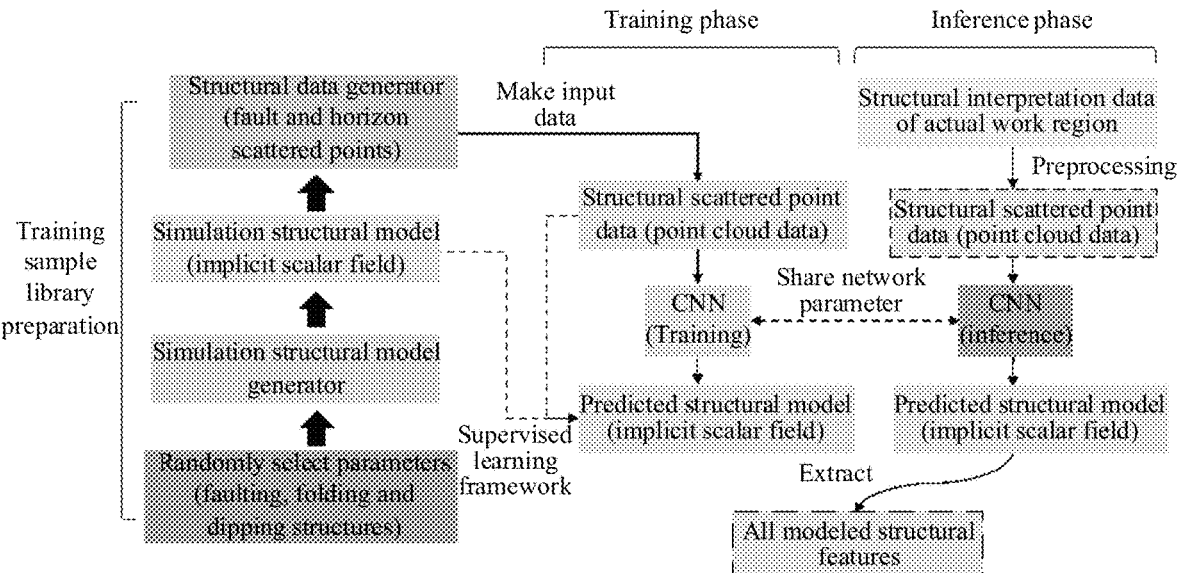
FIG. 4 schematically shows a flowchart of a method of modeling an implicit structure according to embodiments of the present disclosure.

FIG. 4 schematically shows a flowchart of a method of modeling an implicit structure according to embodiments of the present disclosure.

As shown in FIG. 4, the method is mainly divided into a training sample library preparation phase, a training phase and a reasoning phase. In the training sample library preparation phase, parameters of faulting, folding and dipping structures are randomly selected; a simulation structural model is generated by using a simulation structural model generator; then, fault and horizon scattered points of the simulation structural model are extracted to form scattered point data as the input data. In the training phase, scattered point data of incomplete horizons and all faults as the input data are input into the neural network CNN for training, and a network learning process is monitored using the simulation structural model, so as to output a full implicit structural model. In the reasoning phase, the network is applied to actual structural interpretation data in different regions to acquire a corresponding full geological structural model. First, since the structural interpretation data is usually not necessarily located on a regular grid, before a practical application, it is needed to convert the horizon interpretation data and the fault interpretation data of the structural interpretation data in actual work region into a modeling grid and acquire structural data to be input into the network. Then, the structural data is input into the trained implicit structural model to output the implicit structural model that is compatible with the input structural feature and is geologically reasonable. After that, a full geological horizon surface and a full fault surface may be respectively obtained by extracting a model iso-surface and a discontinuous skip feature.

Figure 5:
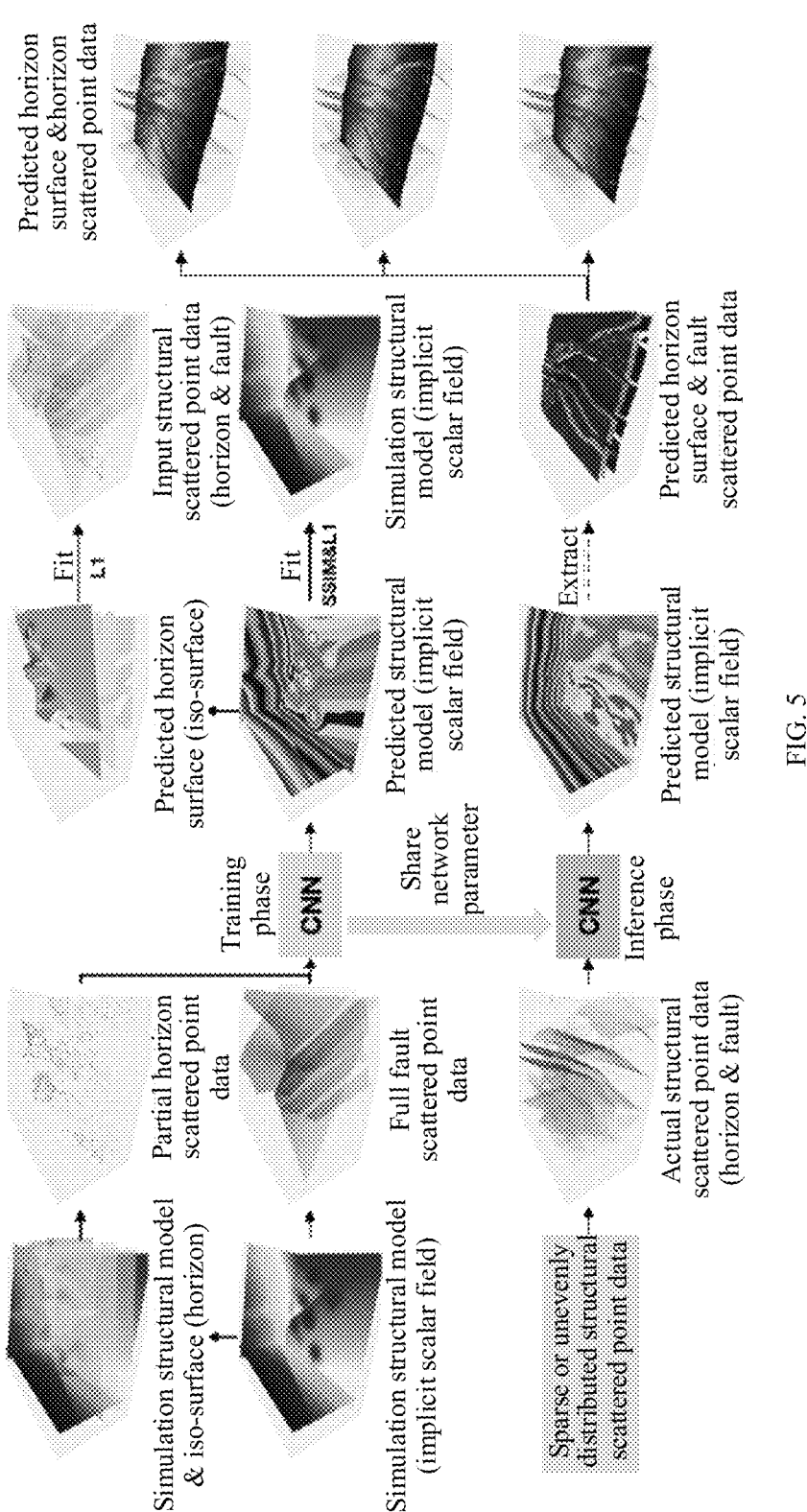
FIG. 5 schematically shows a construction method of generating a spatial scalar function from input sparse structural data as an implicit representation of all geological structures according to embodiments of the present disclosure.

FIG. 5 schematically shows a construction method of generating a spatial scalar function from input sparse structural data as an implicit representation of all geological structures according to embodiments of the present disclosure.

As shown in FIG. 5, an implicit modeling is regarded as a deep learning image restoration problem. Based on knowledge learned from the training data set, the network may reconstruct a full geological structural model from sparse or uneven sampling data. The deep learning method allows to reasonably measure a difference between compared models by defining an appropriate loss function, and may flexibly introduce the geological understanding and a structural constraint. An input of the network is fault and horizon data, and an output of the network is a full-space three-dimensional scalar field as an implicit representation of all geological structures. A faulting and folding simulation is parameterized, and a simulation model with diversified structural features is automatically created by randomly selecting a parameter within a reasonable range, so that a complete training sample library may be constructed. When training the network, horizon and fault scattered points are randomly extracted from the models to generate sparse or unevenly distributed data as the input of the network to predict the full geological structural model, and a simulation model itself is used for supervision. In a process of the network training, a mixed loss function is defined. The function may combine the regression loss based on the single point with the multi-scale structural similarity based on the local sliding Gaussian window to ensure a compatibility of a geological predicted result with the known structure. When the network outputs the implicit model, any full geological horizon surface and fault may be extracted respectively by extracting an iso-surface of the implicit model and detecting a rapid change of a local value of the implicit model (as shown in FIG. 5). Through an actual data test, the trained network may effectively create a model with a reasonable geology and a consistent structure, which may show a potential of using a deep learning technology to improve a quality of the geological modeling. In addition, compared with other methods, since it is not required to initialize the network parameter randomly in each computing process, the modeling result of the method is reproducible.

According to embodiments of the present disclosure, in order to comprehensively evaluate a performance of the trained network and put forward a universality and an effectiveness of the construction method, the structural modeling is performed in three different geological application scenarios, which includes a two-dimensional structural modeling based on field outcrop observation data, a real-time interactive structural modeling based on well logging data and a three-dimensional structural modeling based on actual seismic interpretation data.

Figure 6:
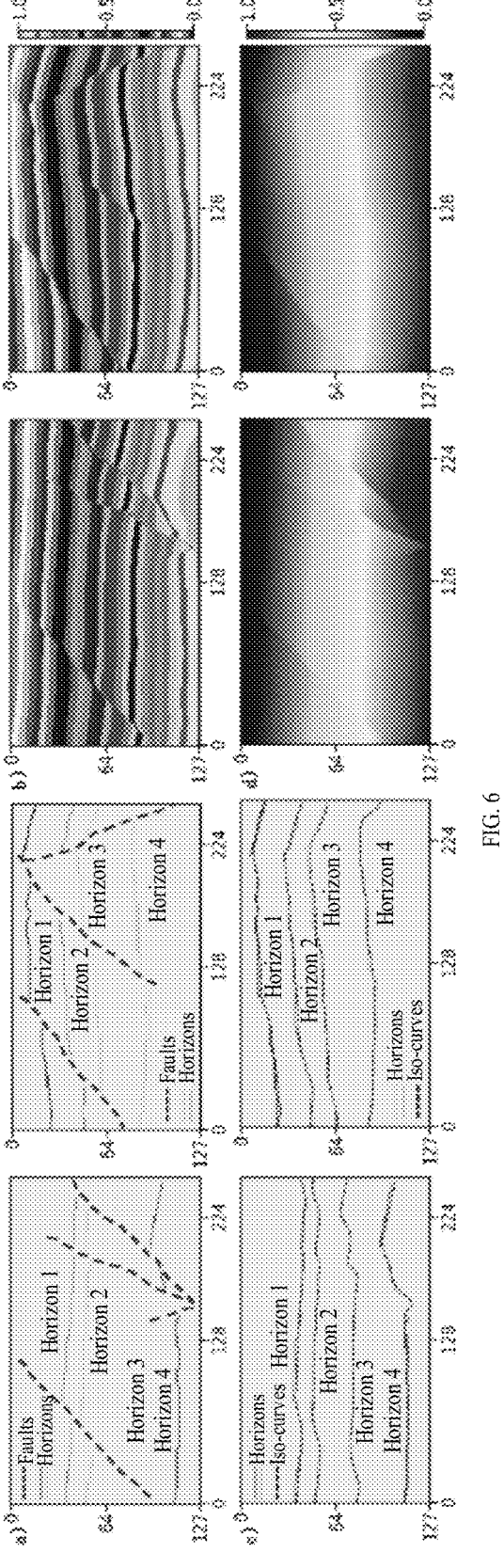
FIG. 6 schematically shows an application of a two-dimensional structural modeling based on field outcrop observation data.

FIG. 6 schematically shows an application of a two-dimensional structural modeling based on field outcrop observation data.

FIG. 6a shows geological interpretation data obtained by a field outcrop observation of a basin. Due to a local subsidence caused by a synsedimentary dissolution of gypsum in the deposit, a series of medium and high angle faults (indicated by dotted lines) are provided in the outcrop section. The synsedimentary faults control a lateral thickness variation of the stratigraphic interface. In order to perform the structural modeling, the field observation data is integrated into a regular model grid, so as to be used as an input of the CNN, so that a full structural model of the outcrop may be obtained.

FIG. 6b shows a predicted structural model displayed using a discrete color bar, and FIG. 6d shows a corresponding modeling result displayed using a continuous color bar. It may be found that different geological horizons (a discontinuity of scalar values) in which a dislocation occurs in the model have a good match with the fault data shown in FIG. 6a as the input of the network. In addition, FIG. 6c shows fittings of four horizons extracted from the modeling results (FIG. 6b and FIG. 6d) with the input horizon data, which demonstrates a compatibility of the modeling result with the input structural data and a geological rationality of the modeling result. In addition, although the network is trained using the simulation data, the network still has a good modeling performance on an actual data set with a complex geological structure.

When modeling the complex geological structure, a reliability of the implicit method depends greatly on a quality of the input data and whether the input data is evenly distributed. However, in the practical application, the structural data is usually extremely sparse or locally aggregated, which may cause the modeling to become an ill-posed problem, that is, a plurality of models that fit the input data are provided. Therefore, especially for noise and structural interpretation data difficult to be self-consistent, a geological uncertainty analysis is very important to find a best modeling result that that conforms to the geological understanding. The implicit method in the related technology may describe a resulting geological uncertainty by disturbing the input data and generate various models. However, they may not study a possible combination law and spatial relationship of a plurality of complex geological structures by randomly simulating a single geometric pattern. In contrast, due to a full automation and a high computational efficiency of an intelligent modeling method, the network may perform the real-time modeling of the input structural data through the human interaction, to generate different structural models, which is helpful to analyze the geological uncertainty.

Figure 7:
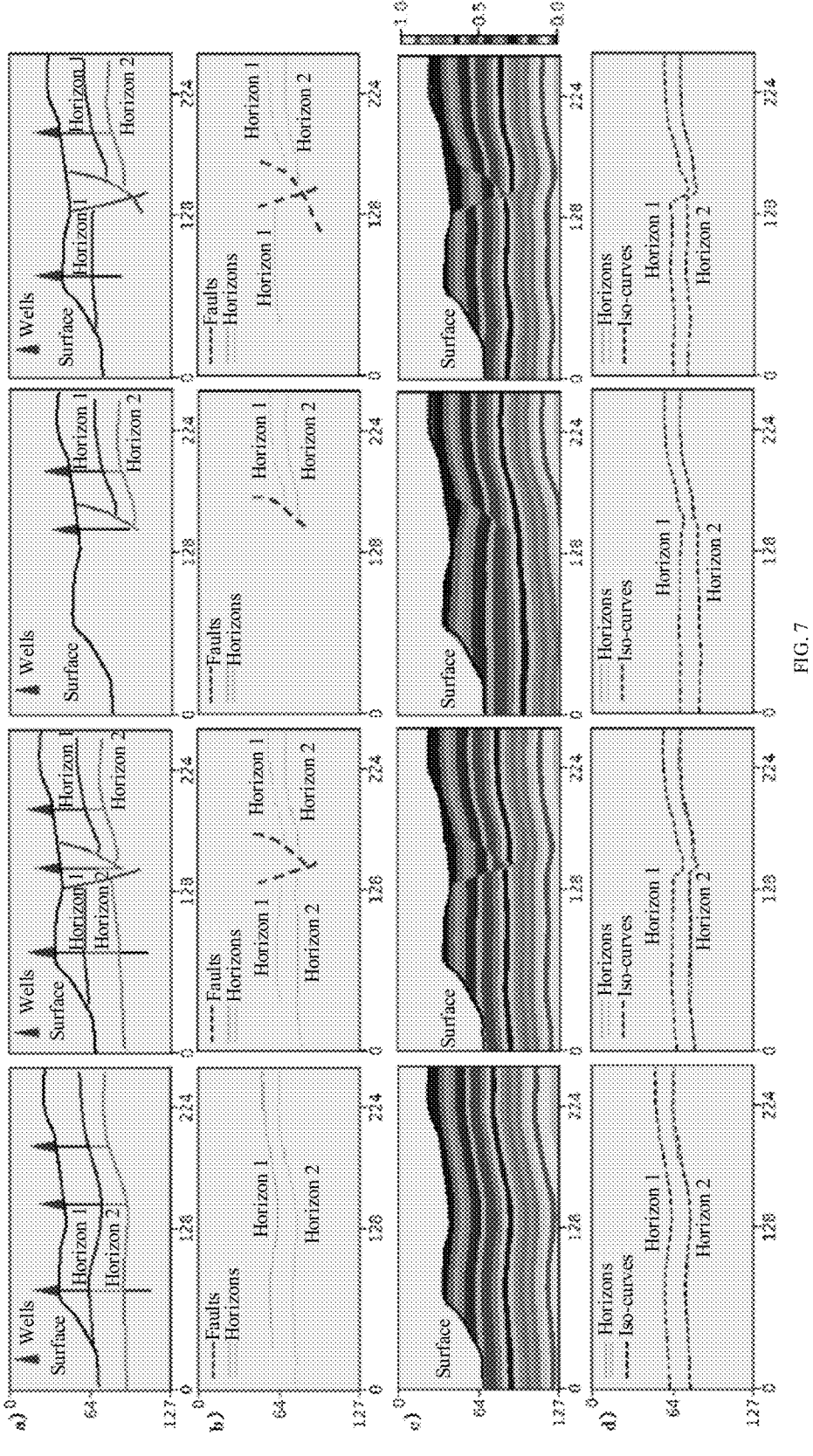
FIG. 7 schematically shows an application of a real-time interactive structural modeling based on well logging data.

FIG. 7 schematically shows an application of a real-time interactive structural modeling based on well logging data.

FIG. 7a performs modeling by using a horizon and a fault interpreted from a borehole and outcrop observation under different geological conditions, so as to study the geological uncertainty related to a structural position change. The first data example shows a simple continuous layered model. However, when considering an additional geometric object (such as a fault or an unconformity surface) to dislocate a continuous geological horizon, the modeling situation becomes more complicated and diversified. In addition, since a transition of the stratigraphic boundary may not be accurately measured from a vertical borehole, a random disturbance of an interpreted horizon position may produce a change of a stratigraphic thickness. As shown in FIG. 7b, the network uses various structural combinations as an input to simulate an influence of various possible structural forms and relationships in FIG. 7a on the modeling process. All results shown in FIG. 7c are computed using a single GPU (NVIDIA Tesla V100). Although the network training takes several hours, an average time of generating each model using the trained network is about 2 milliseconds (a model size is 128×256). At the same time, the trained network is not limited to the specific format of the input data, the input data is flexible, and the input data may be changed in real time. Therefore, the method has an ability of real-time interactive modeling. In addition, FIG. 7d shows a good fitting between the input horizon data and a modeling horizon, which may prove once again that the method may output a geological structural model compatible with a given structural feature.

Figure 8:
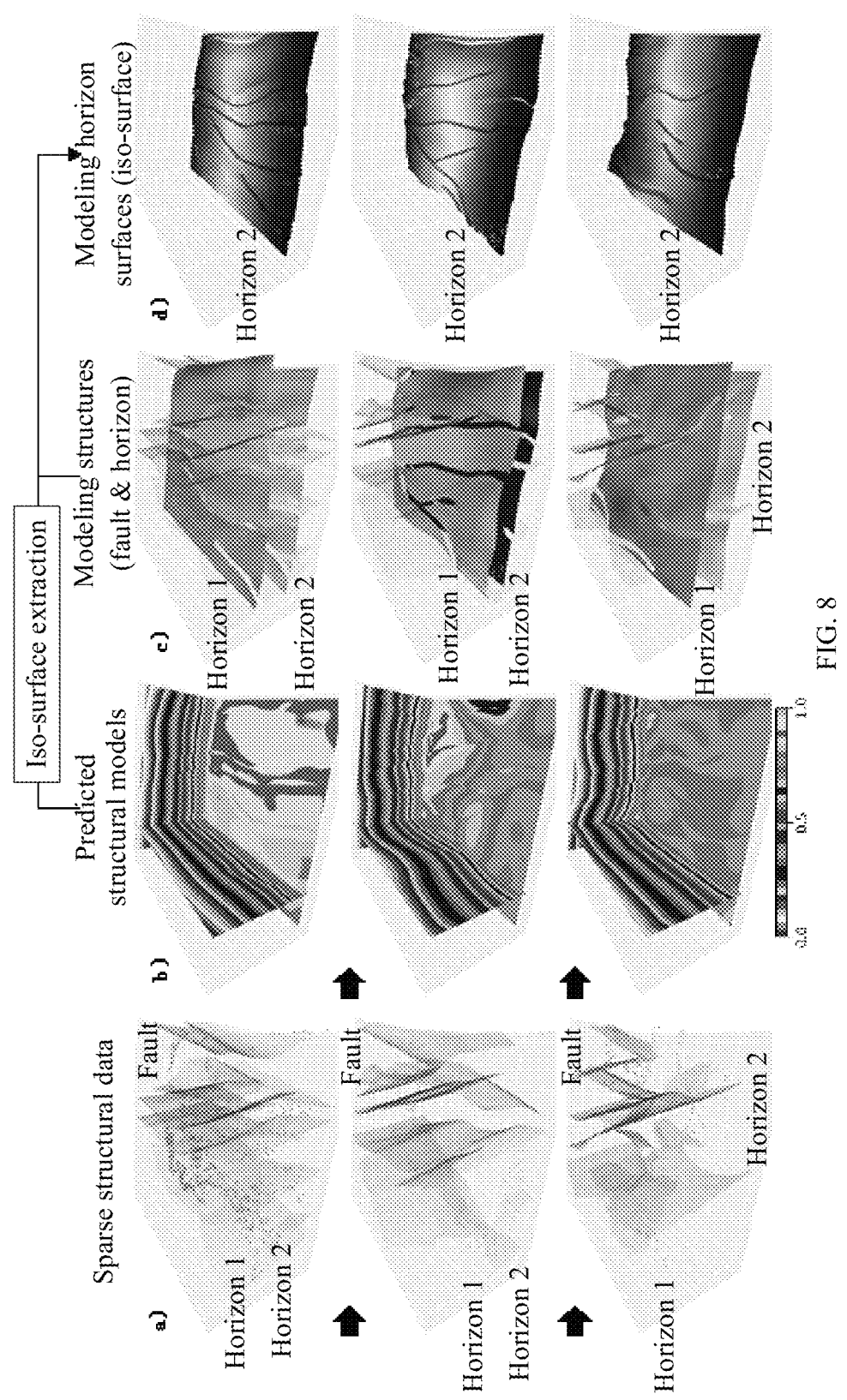
FIG. 8 schematically shows an application case of a three-dimensional geological structural modeling based on actual seismic interpretation data.

FIG. 8 schematically shows an application case of a three-dimensional geological structural modeling based on actual seismic interpretation data.

According to embodiments of the present disclosure, in order to verify a modeling ability of the network, the trained CNN is applied to a three-dimensional structural modeling problem, and it is proposed to extract uneven sampling scattered point data from seismic interpretation data as the network input to construct the full geological structural model. Three-dimensional seismic data collected in a region with a complex structural deformation has a relatively low resolution and signal-to-noise ratio. Due to an influence of noise, some seismic reflection layers are difficult to be tracked continuously in the whole data space. Close spacing and crossing the fault, noise similar to a structural discontinuity and a stratigraphic feature may further complicate and blur a geometric relationship and a spatial organization of a seismic structure.

As shown in FIG. 8a, since a distance between sampled data varies greatly, data points around the geological interface are relatively sparse or aggregated in some local regions. A modeling result shown in FIG. 8b shows that the proposed method may stably generate a geologically effective three-dimensional structural model. In FIG. 8c, an iso-surface extraction method may be used to extract a full geological interface from a generated scalar field and remove the horizon near the fault, so as to highlight a structural discontinuity caused by an existence of the fault.

FIG. 8d shows a reconstructed full horizon interface colored by vertical coordinate values, in which a vertical skip across the fault is provided. As shown in FIG. 8c and FIG. 8d, a structural discontinuity of the network output and the geological interface may be compatible with the input structure, and the predicted model may even keep a change of the folding structure without additionally providing a global information for constraining a modeling behavior. Through a comparison, the input horizon data on the same geological interface may be well matched with a corresponding iso-surface of the predicted model, which may prove that the network may generate the model compatible with the input structural feature.

It should be noted that operations shown in the flowchart in embodiments of the present disclosure may be performed in no particular order, or may be performed simultaneously, unless it is clearly indicated that an execution sequence is provided between different operations or an execution sequence is provided between different operations in a technical implementation.

Based on the above-mentioned method of modeling an interactive intelligent three-dimensional implicit structure based on deep learning, the present disclosure further provides an apparatus of modeling an interactive intelligent three-dimensional implicit structure based on deep learning. The apparatus will be described below in detail with reference to FIG. 9.

Figure 9:
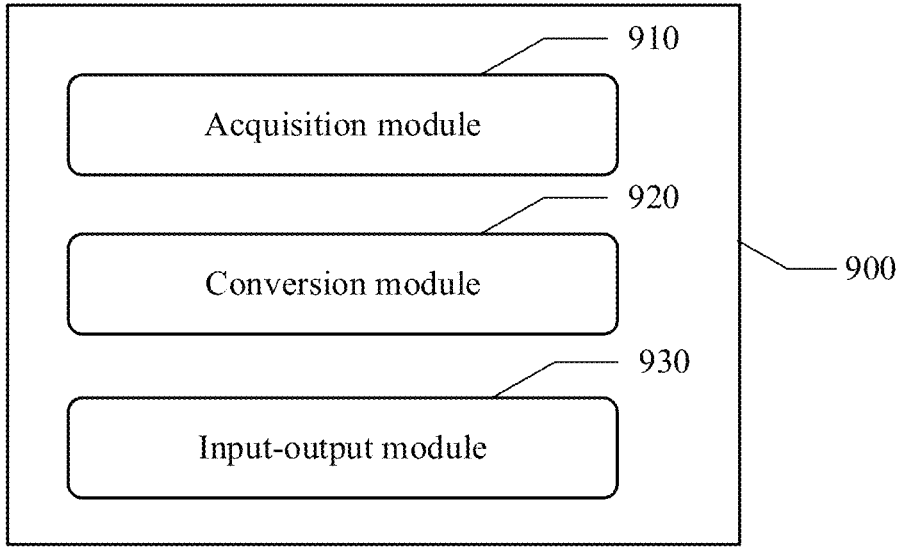
FIG. 9 schematically shows a structural block diagram of an apparatus of modeling an interactive intelligent three-dimensional implicit structure based on deep learning according to embodiments of the present disclosure.

FIG. 9 schematically shows a structural block diagram of an apparatus of modeling an interactive intelligent three-dimensional implicit structure based on deep learning according to embodiments of the present disclosure.

As shown in FIG. 9, an apparatus 900 of modeling an interactive intelligent three-dimensional implicit structure based on deep learning of such embodiments includes an acquisition module 910, a conversion module 920, and an input-output module 930.

The acquisition module 910 is configured to acquire multi-source heterogeneous data about a target region, where the multi-source heterogeneous data includes fault interpretation data and horizon interpretation data, and the multi-source heterogeneous data includes at least one selected from: geological outcrop observation data, well logging data, various geophysical data or empirical knowledge data. In an embodiment, the acquisition module 910 may be configured to perform the operation S110 described above, which will not be repeated here.

The conversion module 920 is configured to convert the fault interpretation data and the horizon interpretation data based on a preset model grid to obtain converted fault interpretation data and converted horizon interpretation data. In an embodiment, the conversion module 920 may be configured to perform the operation S120 described above, which will not be repeated here.

The input-output module 930 is configured to input the converted fault interpretation data and the converted horizon interpretation data into a pre-trained neural network, so as to output a full geological structure model corresponding to the target region. In an embodiment, the input-output module 930 may be configured to perform the operation S130 described above, which will not be repeated here.

Figure 10:
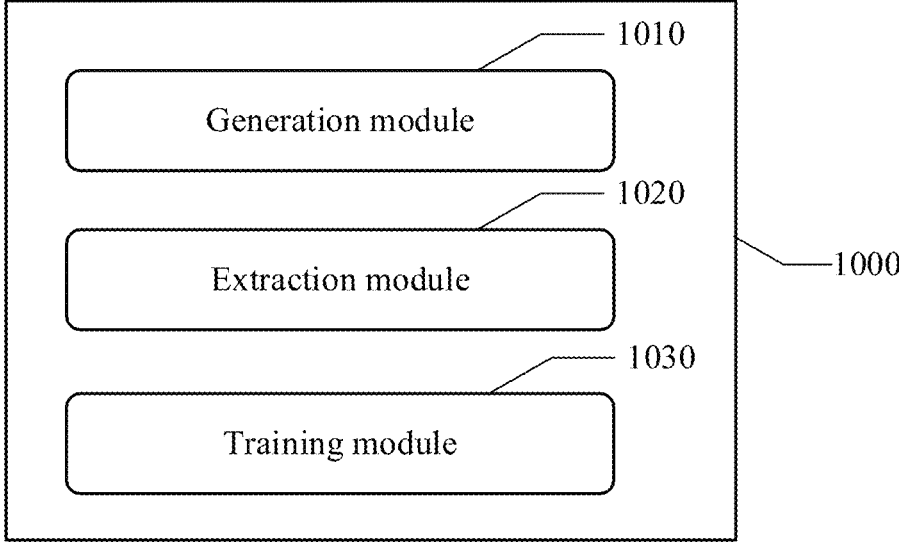
FIG. 10 schematically shows a structural block diagram of an apparatus of training a neural network for constructing a geological structural model based on multi-source heterogeneous data according to embodiments of the present disclosure.

FIG. 10 schematically shows a structural block diagram of an apparatus of training a neural network for constructing a geological structural model based on multi-source heterogeneous data according to embodiments of the present disclosure.

As shown in FIG. 10, an apparatus 1000 of training a neural network of such embodiments includes a generation module 1010, an extraction module 1020, and a training module 1030.

The generation module 1010 is configured to generate a geological simulation structural model by using a data simulation technology so as to obtain a geological simulation structural model library, where the geological simulation structural model has a diversified fold and a fault feature. In an embodiment, the generation module 1010 may be configured to perform the operation S210 described above, which will not be repeated here.

The extraction module 1020 is configured to acquire, for each geological simulation structural model in the geological simulation structural model library, geological fault data of the geological simulation structural model and unevenly distributed geological horizon data of the geological simulation structural model to finally obtain a training sample data set. In an embodiment, the extraction module 1020 may be configured to perform the operation S220 described above, which will not be repeated here.

The training module 1030 is configured to train a neural network by using the training sample data set to obtain the neural network applicable for a geological modeling of the multi-source heterogeneous data. In an embodiment, the training module 1030 may be configured to perform the operation S230 described above, which will not be repeated here.

Any number of modules, sub-modules, units and sub-units according to embodiments of the present disclosure, or at least some functions of any number of modules, sub-modules, units and sub-units may be implemented in a module. Any one or more of the modules, sub-modules, units and sub-units according to embodiments of the present disclosure may be split into a plurality of modules to be implemented. Any one or more of the modules, sub-modules, units and sub-units according to embodiments of the present disclosure may be at least partially implemented as hardware circuits, such as a field programmable gate array (FPGA), a programmable logic array (PLA), a system on chip, a system on substrate, a system on package, an application specific integrated circuit (ASIC), or may be implemented by a hardware or firmware such as any other reasonable method of integrating or packaging the circuit, or may be implemented by any one or any combinations of the three implementation methods of software, hardware and firmware. Alternatively, one or more of the modules, sub-modules, units, and sub-units according to embodiments of the present disclosure may be at least partially implemented as a computer program module. The computer program module, when run, may perform corresponding functions.

According to embodiments of the present disclosure, any number of modules in the acquisition module 910, the conversion module 920, the input-output module 930, the generation module 1010, the extraction module 1020 and the training module 1030 may be combined into a module to be implemented, or any one of the modules may be divided into a plurality of modules. Alternatively, at least some functions of one or more of the modules may be combined with at least some functions of other modules and implemented in a module. According to embodiments of the present disclosure, at least one of the acquisition module 910, the conversion module 920, the input-output module 930, the generation module 1010, the extraction module 1020 and the training module 1030 may be implemented at least partially as hardware circuits, such as a field programmable gate array (FPGA), a programmable logic array (PLA), a system on chip, a system on substrate, a system on package, and an application specific integrated circuit (ASIC), or may be implemented by a hardware or firmware such as any other reasonable method of integrating or packaging the circuit, or may be implemented by any one or any combinations of the three implementation methods of software, hardware and firmware. Alternatively, at least one of the acquisition module 910, the conversion module 920, the input-output module 930, the generation module 1010, the extraction module 1020, and the training module 1030 may be at least partially implemented as a computer program module. The computer program module, when run, may perform corresponding functions.

It should be noted that the section of the apparatus of modeling an interactive intelligent three-dimensional implicit structure based on deep learning in embodiments of the present disclosure corresponds to the section of the method of modeling an interactive intelligent three-dimensional implicit structure based on deep learning in embodiments of the present disclosure. The descriptions of the section of the apparatus of modeling an interactive intelligent three-dimensional implicit structure based on deep learning will not be repeated here, reference may be made to the section of the method of modeling an interactive intelligent three-dimensional implicit structure based on deep learning.

Figure 11:
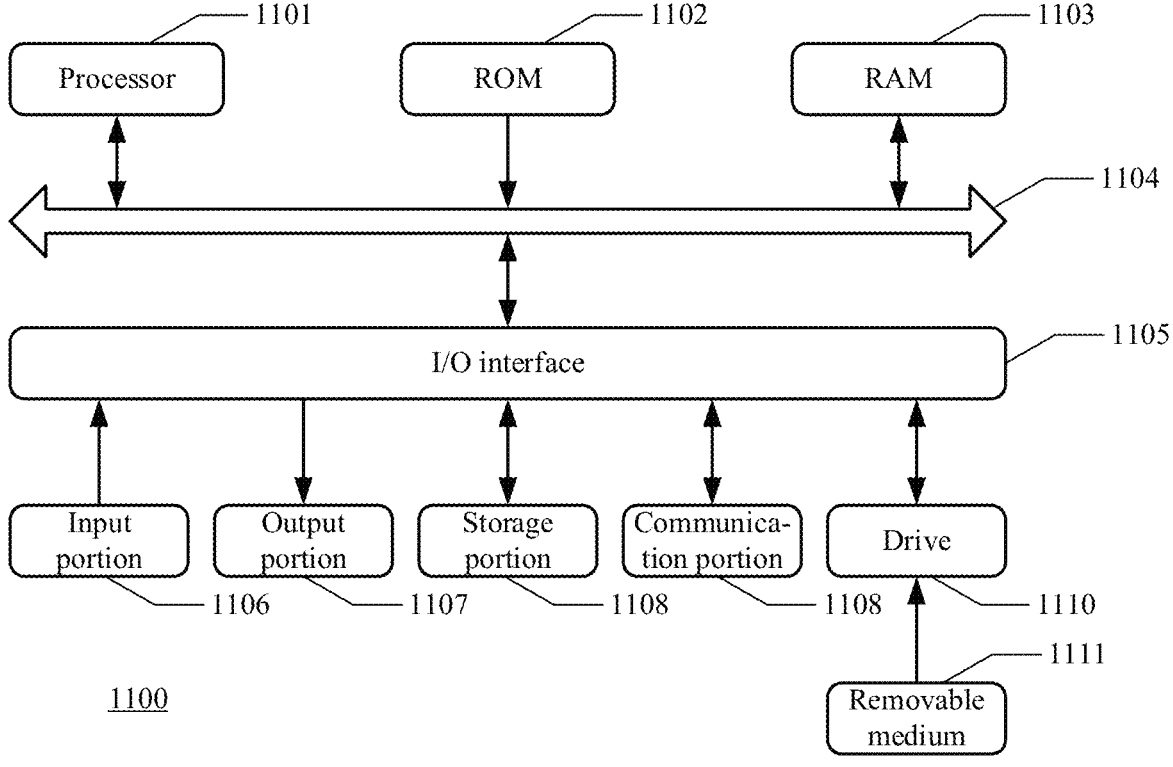
FIG. 11 schematically shows a block diagram of an electronic device for implementing the above-mentioned method according to embodiments of the present disclosure.

FIG. 11 schematically shows a block diagram of an electronic device for implementing the above method according to embodiments of the present disclosure.

As shown in FIG. 11, an electronic device 1100 according to embodiments of the present disclosure includes a processor 1101, which may perform various appropriate actions and processes according to a program stored in a read-only memory (ROM) 1102 or a program loaded into a random access memory (RAM) 1103 from a storage portion 1108.

The processor 1101 may include, for example, a general-purpose microprocessor (e.g., CPU), an instruction set processor and/or a related chipset and/or a dedicated-purpose microprocessor (e.g., an application-specific integrated circuit (ASIC)), etc. The processor 1101 may further include an on-board memory for caching purposes. The processor 1101 may include a single processing unit or a plurality of processing units for performing different actions of a method flow according to embodiments of the present disclosure.

In the RAM 1103, various programs and data required for an operation of the electronic device 1100 are stored. The processor 1101, the ROM 1102 and the RAM 1103 are connected to each other through a bus 1104. The processor 1101 performs various operations of the method flow according to embodiments of the present disclosure by performing programs in the ROM 1102 and/or the RAM 1103. It should be noted that the program may also be stored in one or more memories other than the ROM 1102 and the RAM 1103. The processor 1101 may also perform various operations according to the method flow of embodiments of the present disclosure by performing programs stored in the one or more memories.

According to embodiments of the present disclosure, the electronic device 1100 may further include an input/output (I/O) interface 1105, and the input/output (I/O) interface 1105 is also connected to the bus 1104. The electronic device 1100 may further include one or more of following components connected to the I/O interface 1105: an input portion 1106 including a keyboard, a mouse, etc.; an output portion 1107 including a cathode ray tube (CRT), a liquid crystal display (LCD), etc., and a speaker, etc.; the storage portion 1108 including a hard disk, etc.; and a communication portion 1109 including a network interface card such as a LAN card, a modem, etc. The communication portion 1109 performs a communication processing via a network such as the Internet. A drive 1110 is also connected to the I/O interface 1105 as needed. A removable medium 1111, such as a magnetic disk, an optical disk, a magneto-optical disk, a semiconductor memory, etc., is installed on the drive 1110 as needed, so that a computer program read therefrom may be installed into the storage portion 1108 as needed.

The present disclosure further provides a computer-readable storage medium, and the computer-readable storage medium may be included in the device/apparatus/system described in the above-mentioned embodiments; and the computer-readable storage medium may also exist alone without being assembled into the device/apparatus/system. The above-mentioned computer-readable storage medium carries one or more programs. The one or more programs, when executed, are used to implement the method according to embodiments of the present disclosure.

According to embodiments of the present disclosure, the computer-readable storage medium may be a nonvolatile computer-readable storage medium, which may include, for example, but not limited to: a portable computer disk, a hard disk, a random access memory (RAM), a read-only memory (ROM), an erasable programmable read-only memory (EPROM or a flash memory), a portable compact disk read-only memory (CD-ROM), an optical storage device, a magnetic storage device, or any suitable combination thereof. In the present disclosure, the computer-readable storage medium may be any tangible medium containing or storing a program, and the program may be used by or in combination with an instruction execution system, apparatus or device. For example, according to embodiments of the present disclosure, the computer-readable storage medium may include the ROM 1102 and/or the RAM 1103 described above and/or one or more memories other than the ROM 1102 and/or the RAM 1103.

Embodiments of the present disclosure further include a computer program product, which includes a computer program containing a program code for implementing the method shown in the flowchart. When the computer program product runs in a computer system, the program code is used to enable the computer system to implement the training method or construction method of the geological structural model based on the multi-source heterogeneous data provided by embodiments of the present disclosure.

The computer program, when executed by the processor 1101, executes the above-mentioned functions defined in the system/apparatus of embodiments of the present disclosure. According to embodiments of the present disclosure, the systems, apparatuses, modules, units, etc. described above may be realized by the computer program module.

In an embodiment, the computer program may rely on tangible storage mediums such as an optical storage device, a magnetic storage device, etc. In another embodiment, the computer program may also be transmitted and distributed in a form of a signal on a network medium, downloaded and installed through the communication portion 1109, and/or installed from the removable medium 1111. The program code contained in the computer program may be transmitted by any suitable network medium, including but not limited to: wireless, wired, etc., or any suitable combination thereof.

In such an embodiment, the computer program may be downloaded and installed from the network through the communication portion 1109 and/or installed from the removable medium 1111. When the computer program is executed by the processor 1101, the above-mentioned functions defined in the system of embodiments of the present disclosure are performed. According to embodiments of the present disclosure, the systems, devices, apparatuses, modules, units, etc. described above may be realized by the computer program module.

According to embodiments of the present disclosure, the program code for executing the computer program provided by embodiments of the present disclosure may be written in any combination of one or more programming languages. Specifically, these computing programs may be implemented by using high-level procedural and/or object-oriented programming languages and/or assembly/machine languages. The programming languages include but are not limited to Java, C++, python, "C" languages or similar programming languages. The program code may be completely executed on a user computing device, partially executed on a user device, partially executed on a remote computing device, or completely executed on a remote computing device or a server. In a case of involving the remote computing device, the remote computing device may be connected to the user computing device through any kind of network, including a local region network (LAN) or a wide region network (WAN), or may be connected to an external computing device (e.g., connected through the Internet using an Internet service provider).

The flowcharts and block diagrams in the accompanying drawings illustrate possibly implemented architectures, functions and operations of the systems, methods and computer program products according to various embodiments of the present disclosure. In this regard, each block in the flowcharts or block diagrams may represent a module, a program segment, or part of a code. The above-mentioned module, program segment, or part of the code contains one or more executable instructions for realizing specified logic functions. It should also be noted that in some alternative implementations, functions marked in the blocks may also occur in a different order from those marked in the accompanying drawings. For example, two consecutive blocks may actually be performed in parallel, and sometimes they may be performed in a reverse order, which depends on the functions involved. It should also be noted that each block in the block diagrams or flowcharts and a combination of blocks in the block diagrams or flowcharts may be implemented by a dedicated hardware-based system that performs specified functions or operations, or by a combination of a dedicated hardware and computer instructions.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

Embodiments of the present disclosure have been described above. However, these embodiments are for illustrative purposes only, and are not used to limit the scope of the present disclosure. Although embodiments are described separately above, this does not mean that the measures in various embodiments may not be used advantageously in combination. The scope of the present disclosure is defined by the appended claims and their equivalents. Without departing from the spirit and principles of the present disclosure, those skilled in the art may make various alternatives and equivalent substitutions, and these alternatives and modifications should all fall within the scope of the present disclosure.

What is claimed is:

1. A method of modeling an interactive intelligent three-dimensional implicit structure based on deep learning, comprising:

acquiring multi-source heterogeneous data about a target region, wherein the multi-source heterogeneous data comprises fault interpretation data and horizon interpretation data, and the multi-source heterogeneous data comprises at least one selected from: geological outcrop observation data, well logging data, various geophysical data or empirical knowledge data;

converting the fault interpretation data and the horizon interpretation data based on a preset model grid to obtain converted fault interpretation data and converted horizon interpretation data; and inputting the converted fault interpretation data and the converted horizon interpretation data into a pre-trained neural network, so as to output a full geological structure model corresponding to the target region, wherein converting the fault interpretation data and the horizon interpretation data by using the preset model grid to obtain the converted fault interpretation data and the converted horizon interpretation data comprises:

marking, for each fault in the fault interpretation data, a point within a grid from the fault as a first value to obtain the converted fault interpretation data; and marking, for each horizon in the horizon interpretation data, a point within a grid from the horizon as a second value to obtain the converted horizon interpretation data, wherein the second value is an ordinate average value of all scattered points on the horizon, wherein a method of training the trained neural network comprises:

generating a plurality of geological simulation structural models by using a data simulation technology so as to obtain a geological simulation structural model library, wherein the geological simulation structural model has a diversified fold and a fault feature;

acquiring, for each geological simulation structural model in the geological simulation structural model library, geological fault data of the geological simulation structural model and unevenly distributed geological horizon data of the geological simulation structural model to finally obtain a training sample data set; and training a neural network by using the training sample data set to obtain the neural network applicable for a geological modeling of the multi-source heterogeneous data, wherein the acquiring geological fault data of the geological simulation structural model and unevenly distributed geological horizon data of the geological simulation structural model to obtain a training sample data set comprises:

extracting a discontinuous feature in the geological simulation structural model to obtain the geological fault data;

selecting a preset number of iso-surfaces from iso-surfaces of the geological simulation structural model to obtain a target iso-surface set;

dividing, for each target iso-surface in the target iso-surface set, scattered point data on the target iso-surface into a plurality of data intervals according to an ordinate value range;

randomly discarding a second preset number of data intervals in the plurality of data intervals, and determining scattered point data in remaining data intervals as the geological horizon data; and generating training sample data according to the geological fault data, the geological horizon data and the geological simulation structural model to obtain the training sample data set.

2. The method according to claim 1, wherein the generating a plurality of geological simulation structural models by using a data simulation technology so as to obtain a geological simulation structural model library comprises:

constructing an initial geological simulation structural model, wherein the initial geological simulation structural model is a layered model constant in a horizontal direction and monotonically increasing in a vertical direction, and the initial geological simulation structural model comprises at least one structural parameter; wherein the structural parameter comprises at least one selected from a folding parameter, a dipping parameter or a faulting structural parameter; and adjusting, for each of the at least one structural parameter, the structural parameter within a preset range to obtain the geological simulation structural model library.

3. The method according to claim 1, wherein the selecting a preset number of iso-surfaces from iso-surfaces of the geological simulation structural model to obtain a target iso-surface set comprises:

dividing a value range of all iso-surfaces in the geological simulation structural model into at least one numerical interval in a descending order;

randomly selecting, for each of the at least one numerical interval, a numerical value from the numerical interval to obtain a target numerical value; and determining, based on the geological simulation structural model, an iso-surface corresponding to the target numerical value as a target iso-surface to obtain the target iso-surface set.

4. The method according to claim 1, further comprising:

performing a normalization processing on the geological simulation structural model by using a preset normalization method, so as to obtain a normalized geological simulation structural model;

wherein the acquiring geological fault data of the geological simulation structural model and unevenly distributed geological horizon data of the geological simulation structural model to obtain a training sample data set comprises:

extracting geological fault data of the normalized geological simulation structural model and geological horizon data of the normalized geological simulation structural model to obtain the training sample data set.

5. The method according to claim 1, wherein the neural network comprises an encoder branch and a decoder branch, the encoder branch comprises at least one encoding feature processing unit, and the decoder branch comprises at least one decoding feature processing unit; and wherein the training a neural network by using the training sample data set comprises:

inputting the geological fault data and the geological horizon data into the encoder branch, so as to output a final encoding hidden feature after a processing by the at least one encoding feature processing unit in the encoder branch;

inputting the final encoding hidden feature into the decoder branch, so as to output a predicted structural model after a processing by the at least one decoding feature processing unit in the decoder branch;

inputting the predicted structural model and the simulation structural model into a mixed loss function, so as to output a loss result, wherein the mixed loss function combines a regression loss based on a single point with a multi-scale structural similarity based on a local sliding Gaussian window;

adjusting a network parameter of the neural network according to the loss result until the mixed loss function meets a preset condition; and determining the neural network obtained in response to the mixed loss function meeting the preset condition as the trained neural network.

6. The method according to claim 5, wherein the encoding feature processing unit comprises an inverted residual module and a max pooling layer, and the inverted residual module comprises a dilated convolutional layer, a depthwise separable convolutional layer and a projection convolutional layer;

the inputting the geological fault data and the geological horizon data into the encoder branch, so as to output a final encoding hidden feature after a processing by the at least one encoding feature processing unit in the encoder branch comprises:

inputting the geological fault data and the geological horizon data into the dilated convolutional layer to dilate a feature dimension and output a dilated feature;

inputting the dilated feature into the depthwise separable convolutional layer to perform a feature extraction and output an extracted feature;

inputting the extracted feature into the projection convolutional layer to perform a dimension reduction processing on the extracted feature and output a first encoding hidden feature; and inputting the first encoding hidden feature into the max pooling layer, so as to output the final encoding hidden feature.

7. An electronic device comprising:

one or more processors;

a memory apparatus configured to store one or more programs, wherein the one or more programs, when executed by the one or more processors, are configured to cause the one or more processors to:

acquire multi-source heterogeneous data about a target region, wherein the multi-source heterogeneous data comprises fault interpretation data and horizon interpretation data, and the multi-source heterogeneous data comprises at least one selected from: geological outcrop observation data, well logging data, various geophysical data or empirical knowledge data;

convert the fault interpretation data and the horizon interpretation data based on a preset model grid to obtain converted fault interpretation data and converted horizon interpretation data; and input the converted fault interpretation data and the converted horizon interpretation data into a pre-trained neural network, so as to output a full geological structure model corresponding to the target region, wherein the one or more processors are further configured for:

marking, for each fault in the fault interpretation data, a point within a grid from the fault as a first value to obtain the converted fault interpretation data; and marking, for each horizon in the horizon interpretation data, a point within a grid from the horizon as a second value to obtain the converted horizon interpretation data, wherein the second value is an ordinate average value of all scattered points on the horizon, wherein the one or more processors are further configured for:

generating a plurality of geological simulation structural models by using a data simulation technology so as to obtain a geological simulation structural model library, wherein the geological simulation structural model has a diversified fold and a fault feature;

acquiring, for each geological simulation structural model in the geological simulation structural model library, geological fault data of the geological simulation structural model and unevenly distributed geological horizon data of the geological simulation structural model to finally obtain a training sample data set; and training a neural network by using the training sample data set to obtain the neural network applicable for a geological modeling of the multi-source heterogeneous data, wherein the one or more processors are further configured for:

extracting a discontinuous feature in the geological simulation structural model to obtain the geological fault data;

selecting a preset number of iso-surfaces from iso-surfaces of the geological simulation structural model to obtain a target iso-surface set;

dividing, for each target iso-surface in the target iso-surface set, scattered point data on the target iso-surface into a plurality of data intervals according to an ordinate value range;

randomly discarding a second preset number of data intervals in the plurality of data intervals, and determining scattered point data in remaining data intervals as the geological horizon data; and generating training sample data according to the geological fault data, the geological horizon data and the geological simulation structural model to obtain the training sample data set.

8. A non-transitory computer-readable storage medium having executable instructions stored thereon, wherein the instructions, when executed by a processor, are configured to cause the processor to:

acquire multi-source heterogeneous data about a target region, wherein the multi-source heterogeneous data comprises fault interpretation data and horizon interpretation data, and the multi-source heterogeneous data comprises at least one selected from: geological outcrop observation data, well logging data, various geophysical data or empirical knowledge data;

convert the fault interpretation data and the horizon interpretation data based on a preset model grid to obtain converted fault interpretation data and converted horizon interpretation data; and input the converted fault interpretation data and the converted horizon interpretation data into a pre-trained neural network, so as to output a full geological structure model corresponding to the target region, wherein the instructions are further configured to cause the processor to:

mark, for each fault in the fault interpretation data, a point within a grid from the fault as a first value to obtain the converted fault interpretation data; and mark, for each horizon in the horizon interpretation data, a point within a grid from the horizon as a second value to obtain the converted horizon interpretation data, wherein the second value is an ordinate average value of all scattered points on the horizon, wherein the instructions are further configured to cause the processor to:

generate a plurality of geological simulation structural models by using a data simulation technology so as to obtain a geological simulation structural model library, wherein the geological simulation structural model has a diversified fold and a fault feature;

acquire, for each geological simulation structural model in the geological simulation structural model library, geological fault data of the geological simulation structural model and unevenly distributed geological horizon data of the geological simulation structural model to finally obtain a training sample data set; and train a neural network by using the training sample data set to obtain the neural network applicable for a geological modeling of the multi-source heterogeneous data, wherein the instructions are further configured to cause the processor to:

extract a discontinuous feature in the geological simulation structural model to obtain the geological fault data;

select a preset number of iso-surfaces from iso-surfaces of the geological simulation structural model to obtain a target iso-surface set;

divide, for each target iso-surface in the target iso-surface set, scattered point data on the target iso-surface into a plurality of data intervals according to an ordinate value range;

randomly discard a second preset number of data intervals in the plurality of data intervals, and determine scattered point data in remaining data intervals as the geological horizon data; and generate training sample data according to the geological fault data, the geological horizon data and the geological simulation structural model to obtain the training sample data set.

9. The electronic device according to claim 7, wherein the one or more processors are further configured for:

constructing an initial geological simulation structural model, wherein the initial geological simulation structural model is a layered model constant in a horizontal direction and monotonically increasing in a vertical direction, and the initial geological simulation structural model comprises at least one structural parameter; wherein the structural parameter comprises at least one selected from a folding parameter, a dipping parameter or a faulting structural parameter; and adjusting, for each of the at least one structural parameter, the structural parameter within a preset range to obtain the geological simulation structural model library.

10. The electronic device according to claim 7, wherein the one or more processors are further configured for:

dividing a value range of all iso-surfaces in the geological simulation structural model into at least one numerical interval in a descending order;

randomly selecting, for each of the at least one numerical interval, a numerical value from the numerical interval to obtain a target numerical value; and determining, based on the geological simulation structural model, an iso-surface corresponding to the target numerical value as a target iso-surface to obtain the target iso-surface set.

11. The electronic device according to claim 7, wherein the one or more processors are further configured for:

performing a normalization processing on the geological simulation structural model by using a preset normalization method, so as to obtain a normalized geological simulation structural model;

and wherein the one or more processors are further configured for:

extracting geological fault data of the normalized geological simulation structural model and geological horizon data of the normalized geological simulation structural model to obtain the training sample data set.

12. The electronic device according to claim 7, wherein the neural network comprises an encoder branch and a decoder branch, the encoder branch comprises at least one encoding feature processing unit, and the decoder branch comprises at least one decoding feature processing unit; and wherein the one or more processors are further configured for:

inputting the geological fault data and the geological horizon data into the encoder branch, so as to output a final encoding hidden feature after a processing by the at least one encoding feature processing unit in the encoder branch;

inputting the final encoding hidden feature into the decoder branch, so as to output a predicted structural model after a processing by the at least one decoding feature processing unit in the decoder branch;

inputting the predicted structural model and the simulation structural model into a mixed loss function, so as to output a loss result, wherein the mixed loss function combines a regression loss based on a single point with a multi-scale structural similarity based on a local sliding Gaussian window;

adjusting a network parameter of the neural network according to the loss result until the mixed loss function meets a preset condition; and determining the neural network obtained in response to the mixed loss function meeting the preset condition as the trained neural network.

13. The electronic device according to claim 12, wherein the encoding feature processing unit comprises an inverted residual module and a max pooling layer, and the inverted residual module comprises a dilated convolutional layer, a depthwise separable convolutional layer and a projection convolutional layer;

the one or more processors are further configured for:

inputting the geological fault data and the geological horizon data into the dilated convolutional layer to dilate a feature dimension and output a dilated feature;

inputting the dilated feature into the depthwise separable convolutional layer to perform a feature extraction and output an extracted feature;

inputting the extracted feature into the projection convolutional layer to perform a dimension reduction processing on the extracted feature and output a first encoding hidden feature; and inputting the first encoding hidden feature into the max pooling layer, so as to output the final encoding hidden feature.

\* \* \* \* \*